(12) United States Patent
Jannard et al.

(10) Patent No.: US 7,367,669 B2
(45) Date of Patent: May 6, 2008

(54) EYEGLASS FRAMES

(75) Inventors: James H. Jannard, Eastsound, WA (US); Peter Yee, Irvine, CA (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 11/698,238

(22) Filed: Jan. 25, 2007

(65) Prior Publication Data

US 2007/0121056 A1 May 31, 2007

Related U.S. Application Data

(62) Division of application No. 10/737,709, filed on Dec. 16, 2003, now Pat. No. 7,210,776.

(60) Provisional application No. 60/434,168, filed on Dec. 16, 2002.

(51) Int. Cl.
*G02C 5/00* (2006.01)

(52) U.S. Cl. .......................................... 351/41; 351/83

(58) Field of Classification Search .................. 351/41, 351/44, 83–86, 90–109, 154
See application file for complete search history.

(56) References Cited

U.S. PATENT DOCUMENTS

| 1,555,388 A | 9/1925 | Schumacher |
| 2,789,381 A | 4/1957 | Belgard |
| 4,056,853 A | 11/1977 | Bottazzini et al. |
| 4,729,650 A | 3/1988 | Jennings |
| 5,181,051 A | 1/1993 | Townsend et al. |
| 6,250,756 B1 * | 6/2001 | Jannard et al. ............. 351/126 |

FOREIGN PATENT DOCUMENTS

| EP | 0 196 261 | 1/1986 |
| EP | 0 496 292 A1 | 7/1992 |
| GB | 626350 | 11/1946 |

OTHER PUBLICATIONS

Supplementary European Search Report; Application No. EP 03 79 9918; Jan. 13, 2006.

* cited by examiner

*Primary Examiner*—Huy K Mai
(74) *Attorney, Agent, or Firm*—Knobbe, Martens Olson & Bear, LLP

(57) ABSTRACT

An eyeglass frame that includes a frame body having a lens support portion, and first and second earstem portions, which extend rearwardly from first and second lateral sides of the lens support portion, respectively. The frame body includes a first member and a second member. The first and second members are partially coextensive, and each of the first and second members define a portion of an outward-facing surface of the eyeglass frame.

18 Claims, 20 Drawing Sheets

EYEGLASS FRAMES

CLAIM OF PRIORITY

This application is a divisional of U.S. patent application Ser. No. 10/737,709, filed Dec. 16, 2003 now U.S. Pat. No. 7,210,776, which is related to, and claims priority from, U.S. Provisional Patent Application No. 60/434,168, filed Dec. 16, 2002, each of which is incorporated in its entirety by reference herein and made a part of this specification.

BACKGROUND OF THE INVENTION

1. Field of the Invention

The present invention generally relates to eyeglass frames and, more particularly, to an eyeglass frame constructed from more than one member. The present invention also relates to a method for making such an eyeglass frame.

2. Description of the Related Art

Eyeglass frames generally include a front portion, which supports a pair of optical lenses on opposing sides of a nose bridge. A pair of earstems typically extend in a rearward direction from the front portion. The earstems may be connected to the front portion through a hinge arrangement to allow movement of the earstems between a folded position and an opened positioned, relative to the front portion of the eyeglass frame. In many arrangements, each component (i.e., the front portion and earstems) of the eyeglass frame is monolithic and constructed of a single material, such as metal or plastic. In other arrangements, an internal strengthening member may be included. Such an arrangement is especially common for the earstems of plastic eyeglass frames. However, such a strengthening member is usually not visible, or not prominently visible, and does not form an external surface of the eyeglass frame.

SUMMARY OF THE INVENTION

One aspect of at least one of the inventions disclosed herein, includes the realization that an eyeglass frame can be manufactured with an opaque inner and structurally supportive portion and an outer transparent or translucent and structurally supportive portion covering the inner portion. For example, the outer portion can be made from a clear acetate or polycarbonate material and molded over the inner portion, so as to generate a clear boundary between the inner and outer portions.

In one embodiment, the inner portion is provided with a highly-sculpted outer surface, and the outer portion is transparent or translucent, leaving the inner, highly-sculpted portion visible through the outer portion. In certain applications, this allows the highly-sculpted portion of the frame to be smaller and thus less expensive to manufacture. The outer portion provides additional structural support to the smaller inner portion, without completely eliminating the aesthetic contribution of the inner portion. Where the outer portion is transparent, the aesthetic contribution of the inner portion is essentially unobstructed from view. Accordingly, portions of the frame can be constructed at least partially from a desired material without having to be strong enough to withstand all of the forces imparted to the entire frame assembly.

A preferred embodiment of one of the inventions disclosed herein is directed to an eyeglass frame comprising a frame body including a frame portion and first and second earstem portions. The frame portion defines first and second orbitals, each of said orbitals configured to support an optical lens. The earstem portions are spaced from one another and extend in a rearward direction from said front portion. The frame body comprises a first member and a second member. The first member and the second member are at least partially coextensive, and each of the first and second members define a portion of an outer surface of the frame body.

Another embodiment of at least one invention disclosed herein is directed to an eyeglass frame comprising a frame body including a front portion configured to support at least one optical lens, and first and second earstem portions. The earstem portions are spaced from one another and extend in a rearward direction from the front portion. The frame body comprises a first member and a second member. The first and second members are at least partially coextensive and each define at least a portion of an external surface of the frame body. The first member has sufficient transparency such that a surface of the second member is visible through said first member.

In yet another embodiment of at least one invention disclosed herein, an eyeglass frame comprises a lens support portion, and first and second earstem portions extending rearwardly from first and second lateral sides of the lens support portion, respectively. At least one of the first and second earstem portions comprises a first portion and a second portion disposed over the first portion, the first portion extending over only about one-third of the total length of the earstem.

In an additional embodiment of at least one invention disclosed herein, an eyeglass frame comprises an orbital support portion and first and second earstem portions extending rearwardly from first and second lateral side portions of the orbital support, respectively. Each earstem comprises an inner portion formed of a first material, and an outer portion formed of a second translucent material.

In accordance with an embodiment of at least one invention disclosed herein, a method of manufacturing an eyeglass frame comprises forming a frame body. The frame body including a frame portion and first and second earstem portions. The frame portion defines first and second orbitals, each of the orbitals being sized and shaped to support an optical lens. Additionally, the frame body defines a recess. The method also includes forming an insert portion. The insert portion is sized and shaped to occupy the recess of the frame body. Additionally, the method includes positioning the insert portion into the recess such that each of the frame body and the insert portion define a portion of an external surface of said eyeglass frame.

Another embodiment of at least one invention disclosed herein is directed to a method of manufacturing an eyeglass frame comprising forming a first lens orbital from a first material, and molding a second material around a periphery of said lens orbital.

Yet another embodiment of at least one invention disclosed herein is directed to a method of manufacturing an eyeglass frame comprising forming an orbital support portion of a first material. The method also includes forming at least a first optical lens of the first material. Additionally, the method includes connecting a stiffening member to a periphery of the first optical lens. Finally, the method includes supporting the stiffening member with the orbital support.

Another embodiment of at least one invention disclosed herein is directed to a method of manufacturing an eyeglass frame comprising forming a front portion defining at least one orbital. The method also includes forming a pair of earstems, each of the earstems including a recess. An insert portion is provided within the recess, and the pair of earstems are assembled to the front portion.

Yet another embodiment of at least one invention disclosed herein is directed to an eyeglass frame including a frame body having a frame portion and first and second earstem portions. The frame portion defines at least one orbital configured to support an optical lens. The frame body includes a first layer and a second layer that are at least partially coextensive. The eyeglass frame includes means for affixing the first layer to the second layer such that each layer defines a portion of an outer surface of the frame body.

Yet another embodiment of at least one invention disclosed herein is directed to an eyeglass frame comprising a frame body including a frame portion and first and second earstem portions. The frame portion defines first and second orbitals. Each of the orbitals is configured to support an optical lens. The earstem portions are spaced from one another and extend in a rearward direction from said front portion. The frame body comprises a first member and a second member. A forward-facing surface of the first member defines a first shape. The second member is coupled to the first member and is coextensive with a portion of the forward-facing surface of the first member such that each of the first member and the second member define a portion of a forward-facing surface of the frame body. The second member defines a second shape substantially similar to the first shape.

Another embodiment of at least one invention disclosed herein is directed to a method of manufacturing an eyeglass frame including forming a first frame body member having a frame portion and first and second earstem portions. The frame portion defines first and second orbitals each configured to support an optical lens. A forward-facing surface of the first frame body member defines a first shape. The method further includes forming a second frame body member defining a second shape substantially similar to said first shape and affixing the second frame body member to the first frame body member such that each define a portion of a forward-facing surface of the eyeglass frame.

Yet another embodiment of at least one invention disclosed herein is directed to an eyeglass frame including a frame body defining first and second orbitals. Each of the first and second orbitals are configured to support an optical lens. The frame body includes a first member and a second member. The first member defines a first shape and the second member defines a second shape substantially similar to the first shape. The eyeglass frame also includes means for affixing the second member to the first member such that each define a portion of a forward facing surface of the frame body.

BRIEF DESCRIPTION OF THE DRAWINGS

These and other features, aspects and advantages of the present invention are described below with reference to drawings of preferred embodiments, which are intended to illustrate, but not to limit the present invention. The drawings comprise the following figures.

DETAILED DESCRIPTION OF THE PREFERRED EMBODIMENT

Figure 1:
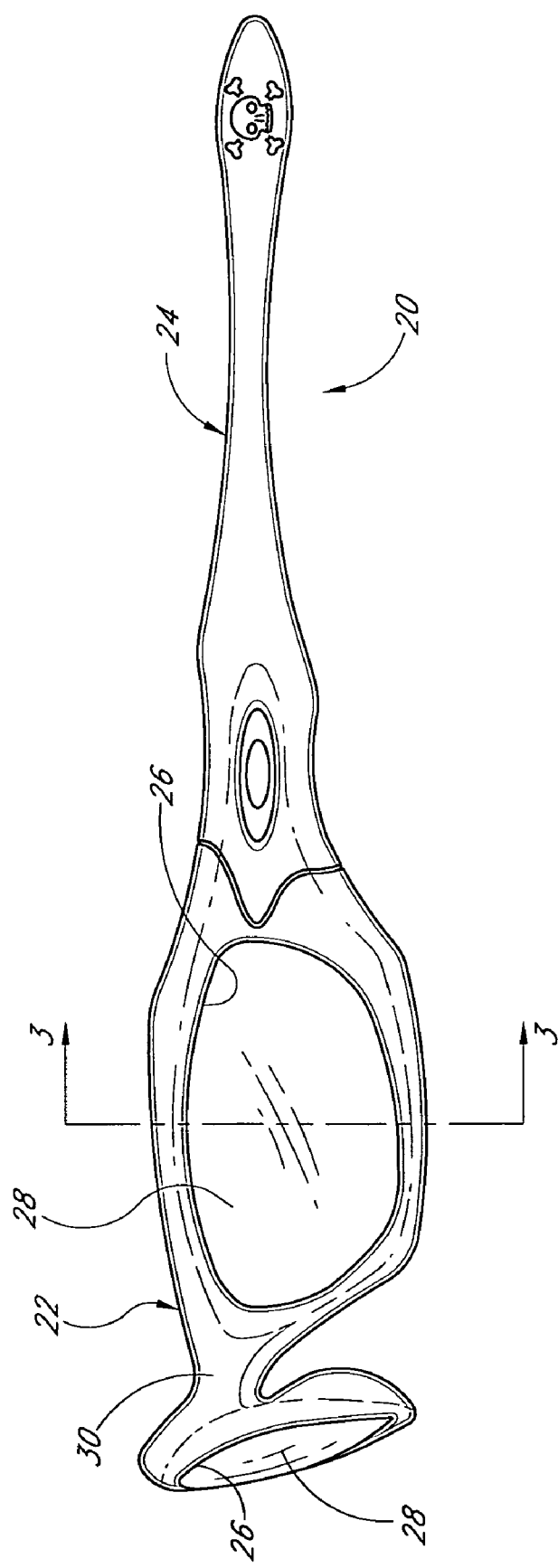
FIG. 1 is a front and left side perspective view of an eyeglass frame having certain features, aspects and advantages of one of the inventions disclosed herein.
Figure 2:
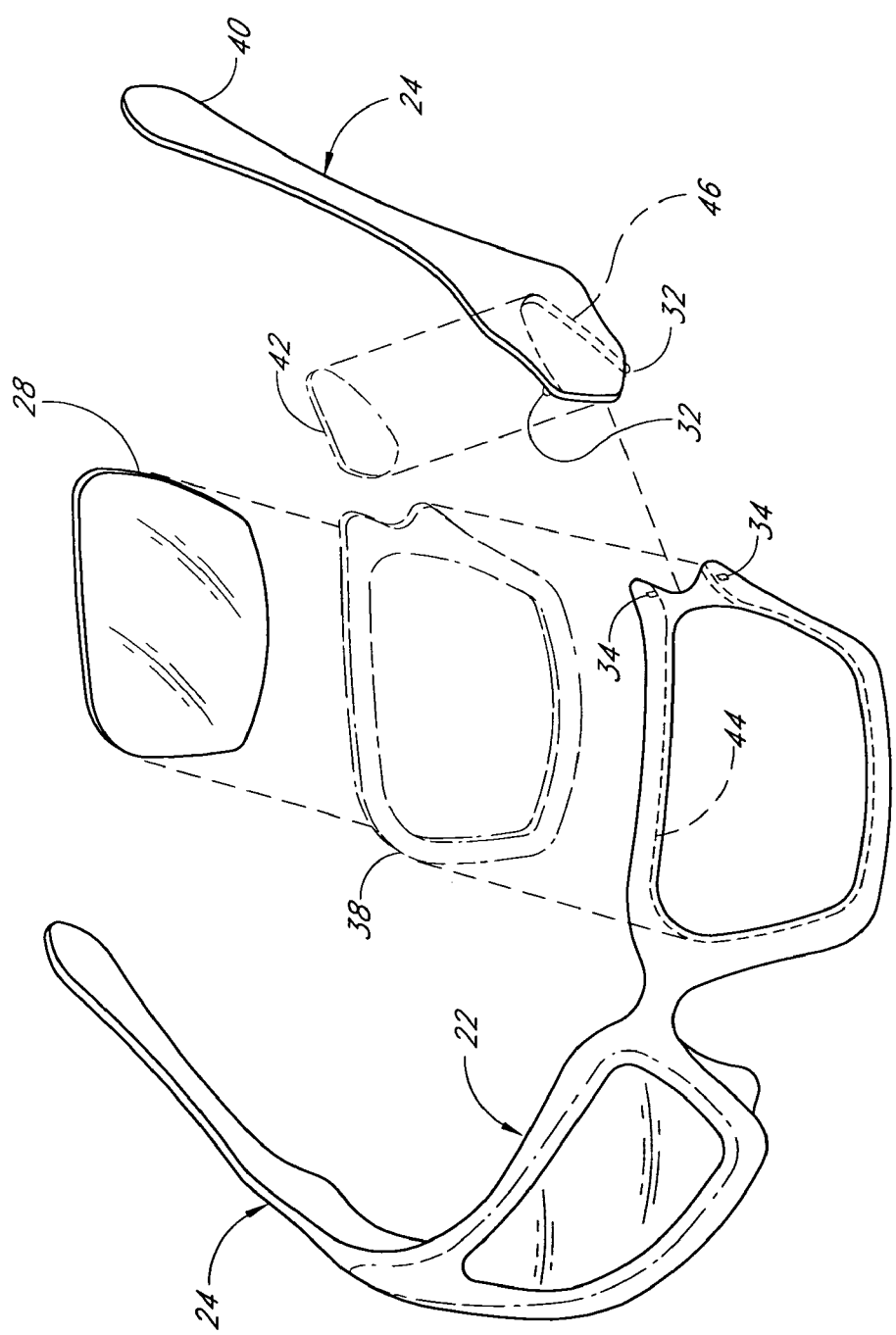
FIG. 2 is an exploded assembly view of the eyeglass frame of FIG. 1.
Figure 3:
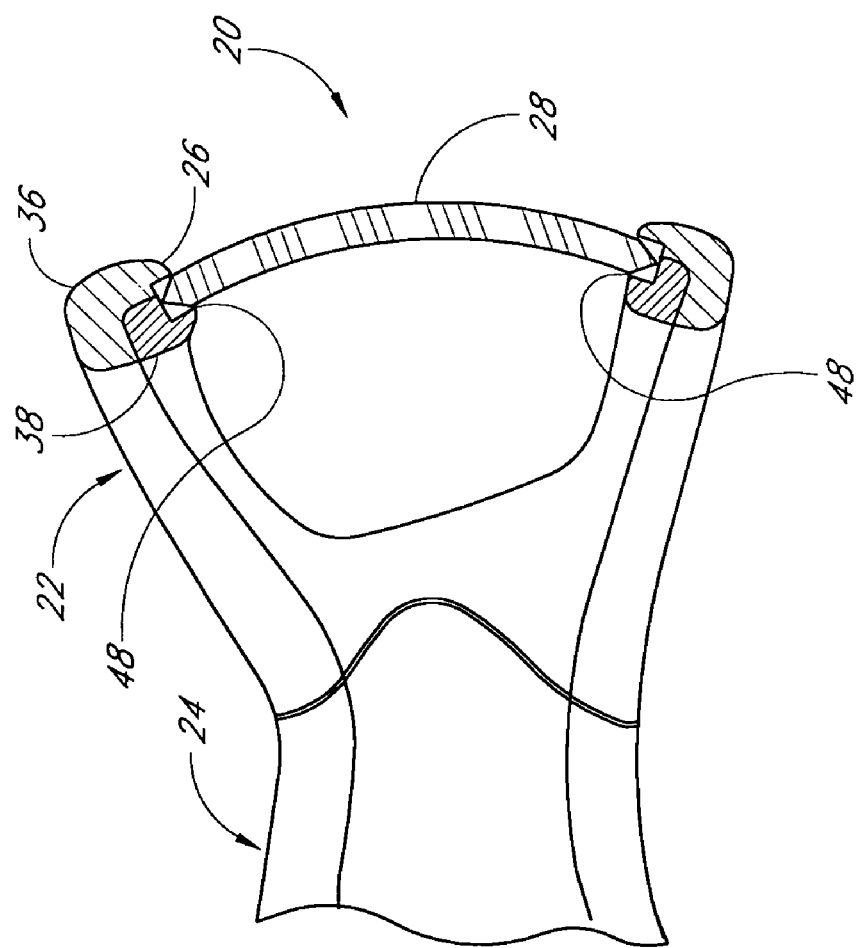
FIG. 3 is cross-sectional view of the eyeglass frame of FIG. 1, taken along the line 3-3 of FIG. 1.

FIGS. 1-3 illustrate an eyeglass frame 20 constructed in accordance with at least one invention disclosed herein. The eyeglass frame 20 includes a front portion 22 and a pair of earstem portions 24. The front portion 22 defines a pair of openings, or orbitals 26, which are configured to support a pair of optical lenses 28. The front portion 22 also defines a nose bridge 30 extending between the pair of orbitals 26.

The earstems 24 extend in a rearward direction from opposing lateral sides of the front portion 22. Desirably, each earstem 24 is connected to the front portion 22 by a hinge arrangement, to be movable between a folded position and an open position relative to the front portion 22.

The hinge arrangement of each earstem 24 comprises a pair of cylindrical protrusions 32 extending from an upper surface and a lower surface, respectively, of a forward end of the earstem 24. The protrusions 32 are sized and shaped to be received within corresponding cavities 34 of each lateral end of the front portion 22. Thus, each earstem 24 is pivotal about an axis defined by the pair of protrusions 32 and corresponding cavities 34. However, other assemblies can be used to pivotally mount the earstems 24 to the front portion 22.

Although the illustrated eyeglass frame 20 includes a pair of orbitals 26 supporting a pair of optical lenses 28, other arrangements are possible wherein a single, toroidal lens is used. In such an arrangement, the orbital 26 may surround the entire lens or only a portion thereof. Furthermore, although the earstems 24 are connected to the front portion 22 through a hinged arrangement in the illustrated eyeglass frame 20, in an alternative arrangement, the earstems 24 and front portion may be unitarily formed, wherein the earstems 24 are substantially fixed relative to the front portion 22.

Preferably, each of the front portion 22 and the earstems 24 are constructed from two distinct materials. That is, preferably the front portion 22 includes an outer portion 36 and an inner portion 38 and each of the earstems 24 includes an outer portion 40 and an inner portion 42. As used throughout this description, the term "outer portion" is intended to refer to the portion that defines the outwardly facing surface of the subject component, i.e., the front portion 22 and earstems 24. Thus, "outer portion" is intended to include the portions 36 and 40 defining the surface that faces outwardly away from a wearer of the eyeglass frame 20. The term "inner portion" is intended to include portions 38, 42 disposed inside the outer portion. In some arrangements, the inner portion also defines a portion of the outer surface of the frame 20, however, this inner portion faces inwardly toward the wearer of the eyeglass frame 20.

The illustrated hinge arrangement, comprised of the protrusions 32 and corresponding cavities 34, connects the outer portion 40 of the earstems 24 to the outer portion 36 of the front portion 22. However, in an alternative hinge arrangement, the inner portions 38, 42 of the front portion 22 and earstems 24 may be connected to one another. Furthermore, a hinge arrangement may be provided that interconnects the front portion 22 and earstems 24 through both of the outer portions 36, 40 and inner portions 38, 42.

In the illustrated eyeglass frame 20, the outer portion 36 of the front portion 22 of the eyeglass frame 20 defines a recess 44 and the outer portion 40 of the earstems 24 defines a recess 46. The inner portions 38, 42 are sized and shaped to occupy the recesses 44, 46 of the front portion 22 and earstems 24, respectively. Thus, the outer portions 36, 40 are partially coextensive with their respective inner portions 38, 42.

In the illustrated eyeglass frame 20, the recesses 44, 46 are formed by a rearwardly facing surface (i.e., the surface facing the wearer of the eyeglass frame 20) of the front portion 22 and the earstems 24, respectively. However, in alternative arrangements, the inner portions 38, 42 may be positioned in recesses formed on other surfaces of the eyeglass frame 20, such as forward, upper or lower surfaces.

In the illustrated arrangement, the recess 44 of the front portion 22 of the eyeglass frame 20 surrounds each orbital 26. Thus, the inner portions 38 also surround each orbital 26. In the illustrated eyeglass frame 20, the recesses 44 of each orbital 26 are separate from one another. However, in an alternative arrangement, the recesses 44, and thus the inner portions 38, of each orbital 26 may be interconnected, such as by a portion extending across the nose bridge 30, for example.

In addition, the recesses 46 of the earstems 24 desirably extend no more than about one-third of the total length of the earstems 24. Thus, the inner portions 42 extend no more than about one-third of the length of the earstem 24. In certain embodiments, this construction provides an additional advantage. For example, in an embodiment where the inner portions 42 are made from a material that has a stiffness greater than that of the material forming the outer portions 40, the limited length of the inner portions 42 allows the earstem to retain much of the flexibility of the lower-stiffness outer portion. In one embodiment, the inner portions 42 are made from a high-stiffness metal, such as titanium, and the outer portions 40 are made from polycarbonate, which is relatively less stiff than titanium.

In other arrangements, the recess 46 and insert portion 42 may extend a greater distance along the earstems 24. Furthermore, although each of the front portion 22 and earstems 24 define a recess 44, 46, respectively in the illustrated eyeglass frame 20, in other arrangements, the inserts 38, 42 may be included on only one of the front portion 22 and the earstems 24.

With reference to FIG. 3, preferably the outer portion 36 and the inner portion 38 of the front portion 22 of the eyeglass frame 20 cooperate to define a groove 48, which is configured to retain an optical lens 28 within each orbital 26. However, in other arrangements, the groove 48 may be defined entirely by the outer portion 36 or the insert portion 38.

The inner portions 38, 42 may be secured within their respective recess 44, 46 in any suitable manner. For example, but without limitation, the inner portions 38, 42 can be mechanically fastened to the outer portions 36, 40 using techniques such as ultra-sonic or RF welding and overmolding. Alternatively, the inner portions 38, 42 may be chemically bonded to the other portions 36, 40 using adhesives or the like.

Preferably, the outer portions 36, 40 are constructed of a material having sufficient transparency such that the inserts 38, 42 are be visible through the outer portions 36, 40. For example, the outer portions 36, 40 may be essentially transparent, wherein the inserts 38, 42 are visible through the other portions 36, 40 with little or no distortion. Alternatively, the outer portions 36, 40 may be translucent, wherein the appearance of the inserts 38, 42 is affected by the outer portions 36, 40, but not completely obfuscated.

In some arrangements, one or both of the inner portions 38, 42 can serve as structural reinforcing members. Optionally, one or both of the inner portions 38, 42 can be stiffer than the outer portions 36, 40. In other arrangements, one or both of the inner portions 38, 42 can be constructed from a material with a modulus of elasticity that is greater than that of the outer portions 36, 40. In such an arrangement, the inner portion 38 of the front portion 22 of the eyeglass frame 20 may serve to reinforce the orbital 26 and thereby provide appropriate support to the optical lens 28 supported therein. For example, but without limitation, where the inner portion 38 is made from a metal such as titanium, and the outer portion 36 is made from polycarbonate, such that the inner portion 38 has a higher overall stiffness than the outer portion 36, the inner portion 38 better protects the shape of the lens 28.

To achieve a greater stiffness, the inner portions 38, 42 may be made from a material that is inherently stiffer than the material of the outer portions 36, 40. Alternatively, the inner portions 38, 42 may be made from the same or similar material as the outer portions 36, 40 and may be manipulated to achieve greater stiffness. For example, both the insert portion 38, 42 and the outer portions 36, 40 may be constructed from a thermoplastic material, with the inner portions 38, 42 being crystallized, while the outer portions 36, 40 are amorphous. Other suitable means for achieving greater stiffness of the inner portions 38, 42 may also be used, such as altering the orientation of the material, for example.

With an eyeglass frame 20 as described above, the inner portions 38, 42 may be made from a colored material, while the outer portions 36, 40 may be transparent or translucent. Accordingly, in such an arrangement, the colored inner portions 38, 42 are visible through the outer portions 36, 40 to provide a desired color throughout a selected portion of the eyeglass frame 20.

Advantageously, such an arrangement enables flexibility in changing the color of the eyeglass frames being produced in a short time frame. The illustrated arrangement also eliminates the need of stockpiling large numbers of complete eyeglass frames in a variety of colors. For example, with a preferred method of manufacturing the eyeglass frame 20, the outer portions 36, 40 of the front portion 22 and earstems 24, respectively, may be manufactured in advance, or on a continual basis, based on predicted, long term demand. The inner portions 38, 42 may be produced in smaller amounts, or batches, to meet immediate demand for eyeglass frames of a desired color(s), or materials.

Accordingly, the outer portions 36, 40 may be produced in quantities sufficient to meet long term forecasts for the demand of a specific frame style, while the quantities of various colors of the inner portions 38, 42 may be changed on a frequent basis to meet immediate demand for specific colors of the eyeglass frame. Preferred methods for constructing the eyeglass frame 20 of FIGS. 1-3 are described in greater detail below with reference to FIGS. 6-8.

Figure 4:
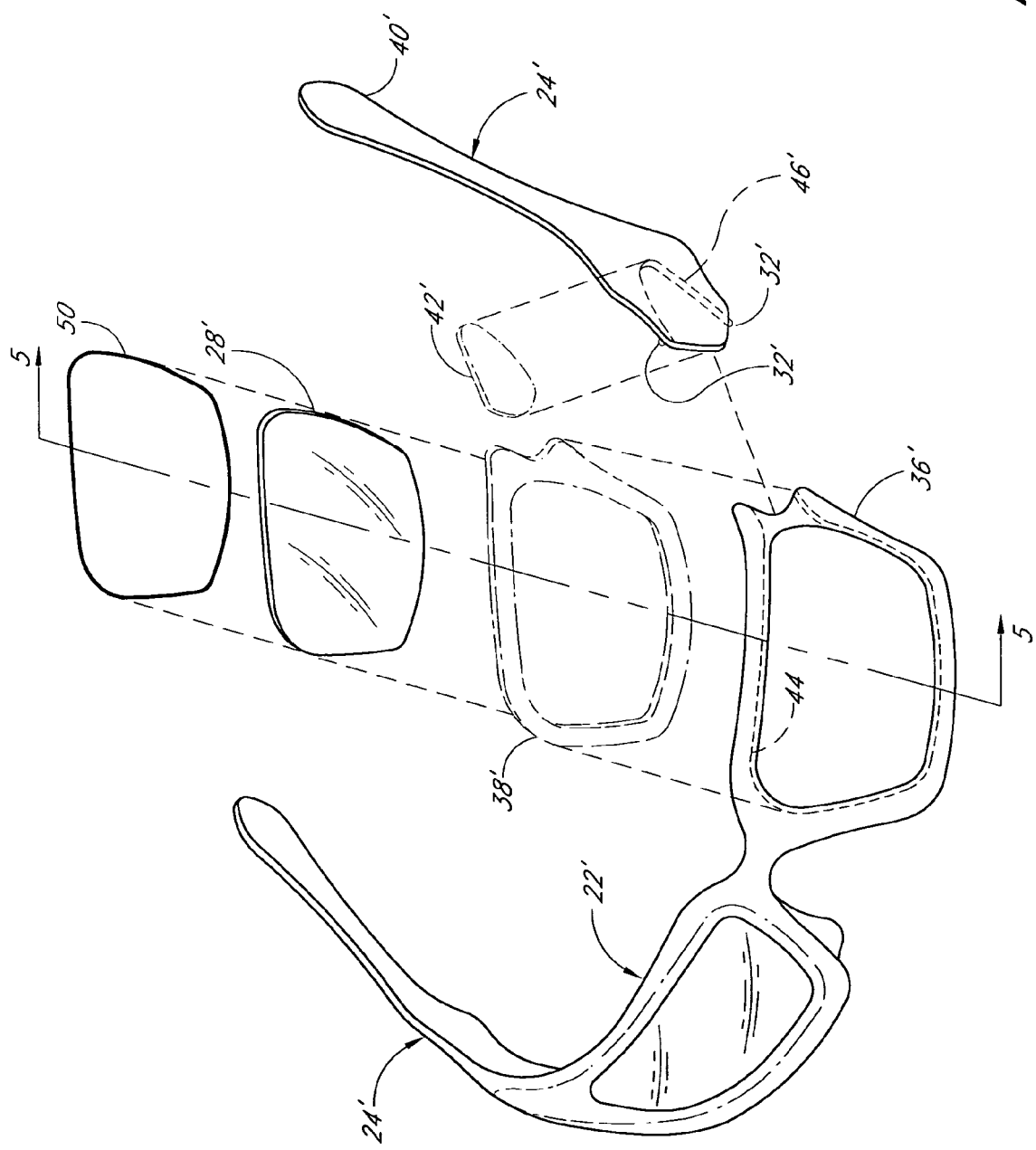
FIG. 4 is an exploded assembly view of a modification of the eyeglass frame of FIG. 1.
Figure 5:
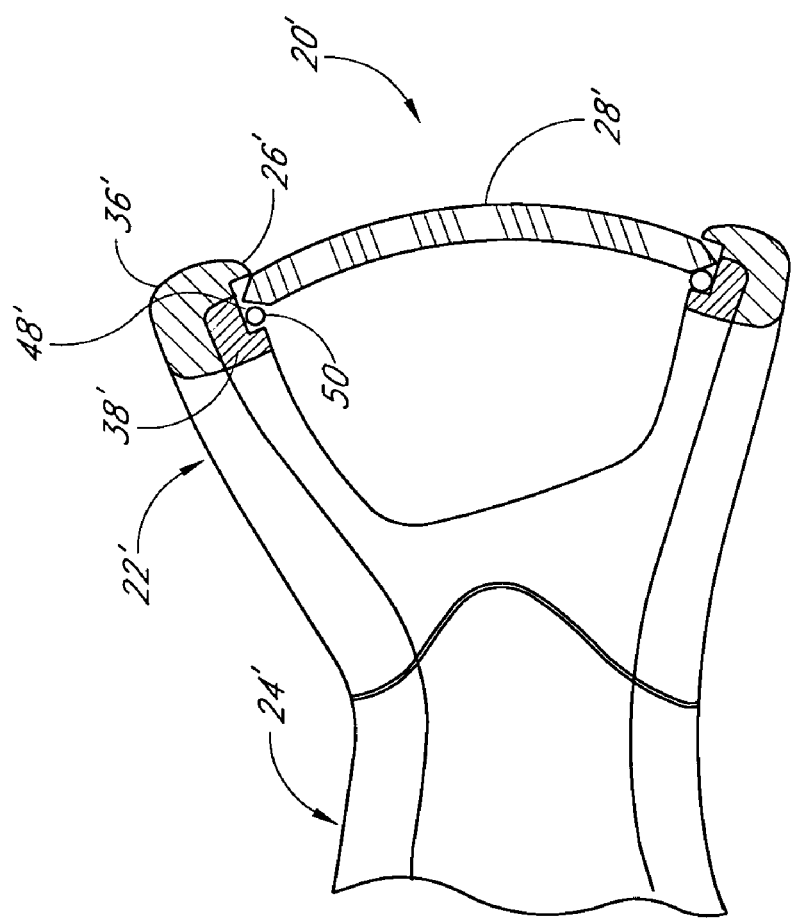
FIG. 5 is a cross-sectional view of the eyeglass frame of FIG. 4 taken along the line 5-5 of FIG. 4.

FIGS. 4 and 5 illustrate a modification of the eyeglass frame 20 of FIGS. 1-3 and is generally referred to by the reference numeral 20'. The eyeglass frame 20' is similar to the eyeglass frame 20 of FIGS. 1-3 and, therefore, like reference numerals will be used to indicate like components, except that a prime (') is added.

The front portion 22' of the eyeglass frame 20' includes an inner portion 38', which preferably is constructed from a material that is stiffer than the material of the outer portion 36'. Preferably, the inner portion 38' is constructed from a metal, such as steel, titanium or magnesium, for example, and the outer portion 38' is constructed from a plastic material. The increased stiffness of the inner portion 38' provides support to, and inhibits distortion of, the optical lens 28'. In addition, the stiffer inner portion 38' inhibits unintended dislodgment of the optical lens 28' from the eyeglass frame 20'.

Preferably, the inner portion 38' is sized and is sufficiently stiff such that it is not distorted during insertion of the optical lens 28' into the groove 48', unlike the procedure commonly used for inserting a lens into a plastic eyeglass frame. To permit insertion of the lens 28' in to the groove 48', the groove 48' is wider than the thickness of the lens 28'. Accordingly, the lens 28' may be positioned into the groove 48', without requiring the inner portion 38' to be flexed, or distorted.

To secure the lens 28' within the groove 48', a retaining member, such as a gasket 50, can be inserted into the groove 48' behind the optical lens 28'. Desirably, the retaining member 50 is somewhat flexible and is sized and shaped, along with an optical lens 28', to occupy the entire width of the groove 48'. Desirably, the retaining member 50 is at least slightly compressed when positioned within the groove 48' such that it exerts a force on the lens 28' to ensure that the lens 28' is securely held within the groove 48'.

Although the above-described arrangement is preferred, other suitable arrangements to retain the lens 28' to the insert 38' may also be used. For example, a typical rim lock arrangement may be used wherein a cut is made through the insert portion 38', in a radial direction, to permit the insert member 38' to flex in order to allow the optical lens 28' to be inserted into the groove 48'. The two sides of the insert portion 38' on opposing sides of the cut may be secured to one another with a fastener, such as a screw, for example. Other arrangements apparent to one of skilled in the art are also possible.

Eyeglass frames constructed entirely from a metal material are substantially more expensive than eyeglass frames constructed from a plastic material. A portion of the additional expense is a result of the difference in the cost of the raw material. An additional cause for the greater expense of metal eyeglass frames compared to plastic frame is the greater difficulty in forming a metal material into the often intricate shape of an eyeglass frame. For example, the hinge manufacture of the connection between the earstems and the front portion of the eyeglass frame is substantially more difficult for a metal frame.

Advantageously, with the eyeglass frame 20, 20' described above, the appearance of a metal frame may be achieved with the use of metal inner portions 38, 42, 38', 42' for a substantially reduced cost compared to a frame made entirely of metal. The cost savings is realized both by using less of the more expensive metal material and by providing inner portions 38, 42, 38', 42' having a relatively basic shape. Therefore, forming of the metal inner portions 38, 42, 38', 42' is less complex than forming an entire frame from a metal material and the more complex portions of the frame 20, 20' (e.g., the hinge assembly) may be formed from plastic. Accordingly, an eyeglass frame 20, 20' as illustrated in FIGS. 1-5 presents a distinct advantage over frames constructed entirely of either metal or plastic materials.

With reference to FIGS. 6-10, a number of preferred methods for constructing an eyeglass frame such as the frames 20, 20', are illustrated. The methods are described in relation to a number of process flow diagrams, which set forth preferred steps in the construction of an eyeglass frame. As will be apparent to one of skill in the art, not all of the steps are necessarily required to practice the invention and, furthermore, additional steps can be performed in addition to those illustrated.

Figures 6, 7:
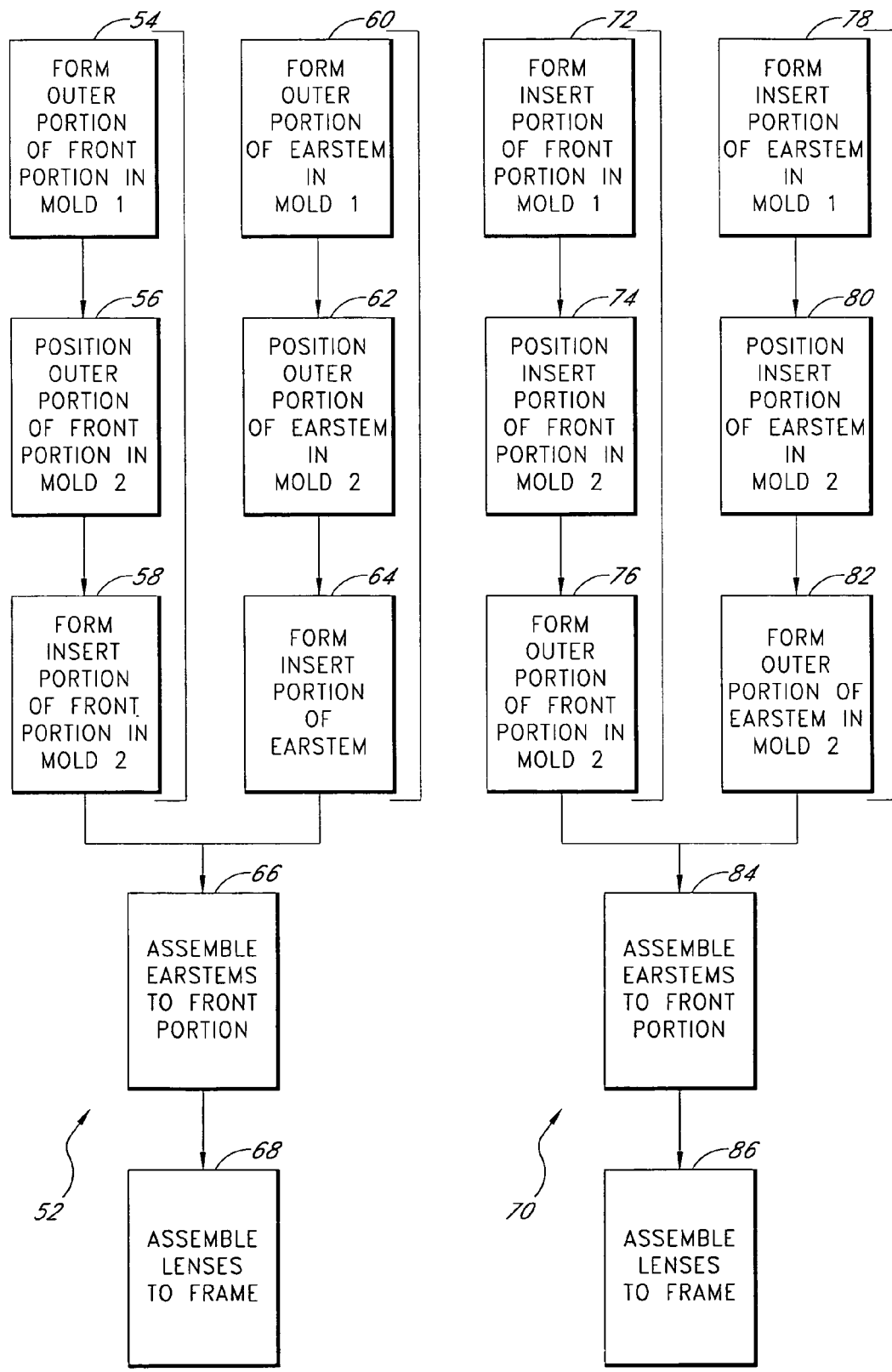
FIG. 6 is a flow diagram of a preferred method for constructing the eyeglass frame of FIG. 1, wherein the outer portion of the frame body and earstems are formed first and an insert portion of the frame body and earstems are formed over the outer portions.
FIG. 7 is a flow diagram of a preferred method of constructing the eyeglass frame of FIG. 1, wherein an insert portion of the frame body and earstems is formed first and the outer portion of the frame body and earstems are formed over the insert portions.

FIG. 6 illustrates a preferred method 52 for constructing the eyeglass frame 20 of FIGS. 1-3 utilizing a process wherein the outer portions 36, 40 of the front portion 22 and earstems 24, respectively, are formed initially and the inner portions 38, 42 are formed within the recesses 44, 46 of the outer portions 36, 40.

The method 52 includes a first step 54 of forming the outer portion 36 of the front portion 22 of the frame 20 in a first mold. In a preferred embodiment, the outer portion 22 is formed by injection molding a translucent or transparent, plastic material such as, for example, but without limitation, polycarbonate.

The formed outer portion 22 is then positioned within a second mold in step 56. In step 58, the insert portion 38 is then formed in the second mold, wherein the recess 44 acts as a portion of the mold surface. Such a process is referred to as "over-molding".

The first mold and the second mold may be completely separate from one another or they may be separate portions of the same molding machine. For example, the outer portion 36 may be molded in the first mold according to step 54 and then may be stored as work-in-process material and subjected to steps 56 and 58 at a later time. Alternatively, the outer portion 36 may be molded in a first portion of a molding machine and transferred to a second mold immediately after withdrawal from the first mold. That is, the outer portion 36 and the insert portion 38 may be formed in a single process step comprising two substeps.

Similarly, the outer portions 40 of the earstems 24 are formed in a first mold in step 60. In step 62, the outer portions 40 are transferred to a second mold and the inner portions 42 of the earstems 24 are formed in step 64 in a manner similar to that described above in relation to steps 56 and 58.

After the front portion 22 and the earstem portions 24 have been formed, they are assembled to one another in step 66. With the hinged arrangement comprising a pair of protrusions 32 and corresponding cavities 34, as described above, the earstems 24 may be snapped into place. Alternatively, if the front portion 22 in the earstems 24 are connected by a separate hinge assembly, additional process steps may be required, as is apparent to one of skill in the art.

In step 68, the lenses 28 are assembled to the frame 20 in a known manner. Preferably, the lenses 28 can be snapped into place within the groove 48 of the eyeglass frame 20, due to the flexible nature of the plastic material forming the frame 20.

With reference to FIG. 7, an alternative method for constructing an eyeglass frame, such as the eyeglass frame 20 of FIG. 1, is illustrated. In the method 70, the inner portions 38, 42 of the front portion 22 and earstems 24, are initially formed and the outer portions 36, 40 are formed over the inner portions 38, 42.

In step 72, the insert portion 38 of the front portion 22 is formed in a first mold. In step 74, the formed insert portion 38 is positioned in a second mold and, in step 76, the outer portion 36 is formed over the insert portion 38 in the second mold. Preferably, the steps 72, 74, 76 are substantially similar to the methods described above in relation to the method 52 of FIG. 6. Accordingly, in method 70, the insert portion 38 and outer portion 36 may be formed as a single process step or the insert portion 38 may be formed as a separate process step as described above.

Similarly, in step 78, the insert portion 42 of the earstem 24 is formed in a first mold. Then, in step 80, the insert portion 42 is placed within a second mold and, in step 82, the outer portion 40 is formed over the insert portion 42 in the second mold.

Similar to the method 52 of FIG. 6, once the front portion 22 and earstems 24 are formed, they are assembled to one another in step 84. In step 86, the lenses 28 are assembled to the frame 20.

Figure 8:
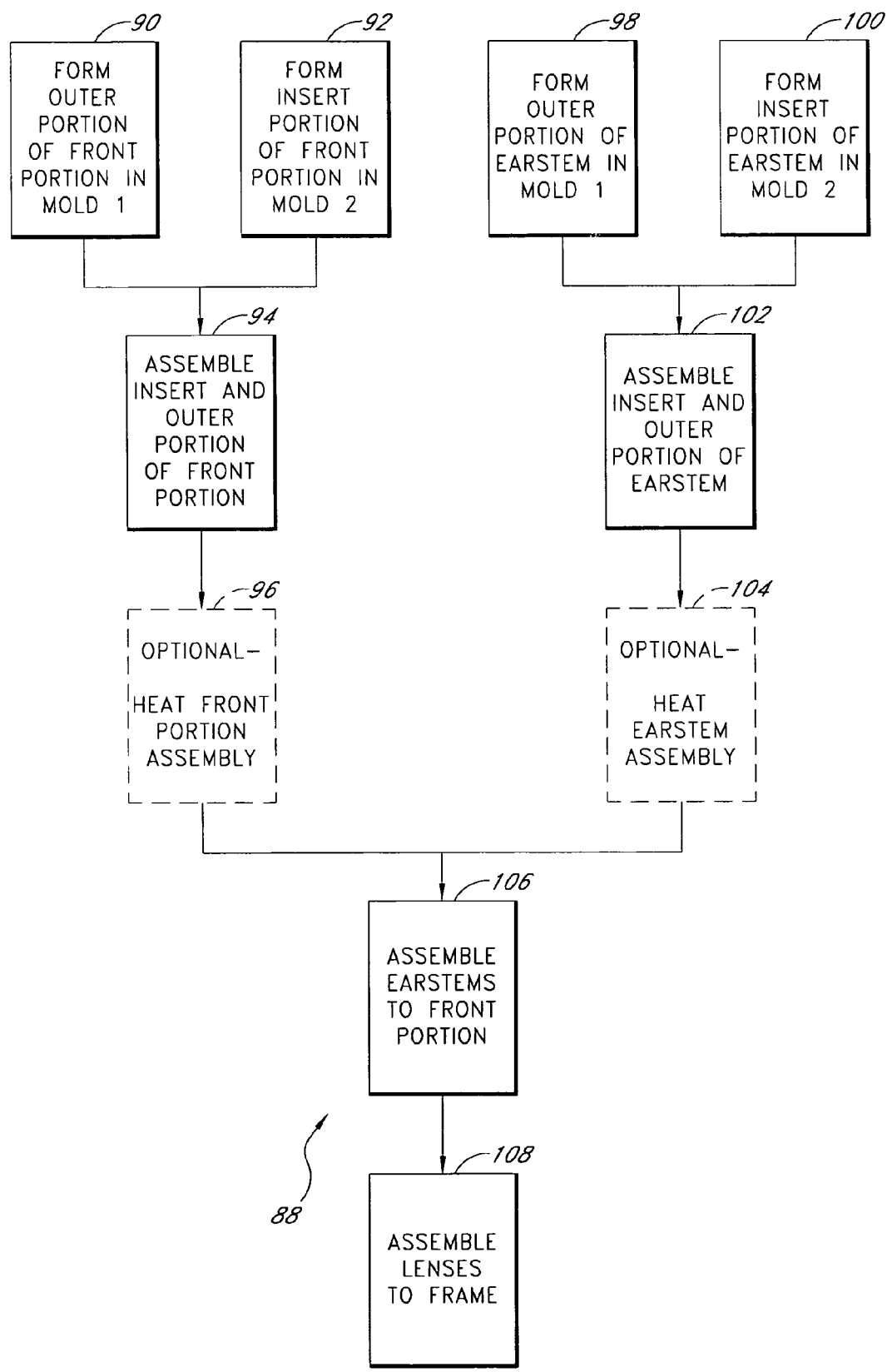
FIG. 8 is a flow diagram of a preferred method for constructing the eyeglass frame of FIG. 1, wherein the outer portion of the frame body and the earstems and the insert portion of the body and the earstems are formed separately and then assembled together.

With reference to FIG. 8, an alternative method 88 to construct an eyeglass frame, such as the frame 20 of FIGS. 1-3, is illustrated. In the illustrated method 88, the outer portions 36, 40 and the inner portions 38, 42 are formed separately from one another. Once formed, the respective inner portions 38, 42 and outer portions 36, 40 are assembled together. Specific steps of the preferred process 88 are described in greater detail below.

In step 90, the outer portion 36 of the front portion 22 is formed in a first mold. Separately, in step 92, the insert portion 38 is formed in a second mold. Once the insert portion 38 and outer portion 36 are formed, they are assembled to one another in step 94. The outer portion 36 and insert portion 38 may be formed from a plastic material by injection molding or, alternatively, may be formed from other suitable materials or processes.

As described above in relation to FIGS. 1-3, the outer portion 36 and the insert portion 38 may be mechanically coupled, such as with a fastener member, or may be secured together by a snap-fit arrangement, for example. Additionally, or alternatively, the outer portion 36 and the insert portion 38 may be chemically coupled to one another, such as with adhesives or the like. Optionally, in step 96, once the outer portion 36 and the insert portion 38 are assembled, the front portion 22 of the eyeglass frame 20 may be subjected to a raised temperature to induce chemical bonding, or adhesion, between the contacting surfaces of the outer portion 36 and the insert portion 38.

Similarly, in step 98, the outer portion 40 of the earstem 24 is formed in a first mold. Separately, the insert portion 42 of the earstem 24 is formed in a second mold in step 100. After being formed, the outer portion 40 and the insert portion 42 of the earstem 24 are assembled in step 102, preferably in a manner similar to that described in relation to step 94. Optionally, the assembly of the outer portion 40 and the insert portion 42 may be heated to enhance the bonding therebetween in step 104, as described in relation to step 96.

Once the front portion 22 in the earstems 24 are formed, they are assembled to one another in step 106. Once the eyeglass frame 20 is assembled in step 106, the lenses 28 are assembled to the frame 20 in step 108. These assembly steps 106, 108 preferably are substantially similar to the assembly steps 66, 68 or 84, 86 described in relation to FIGS. 6 and 7.

Figure 9:
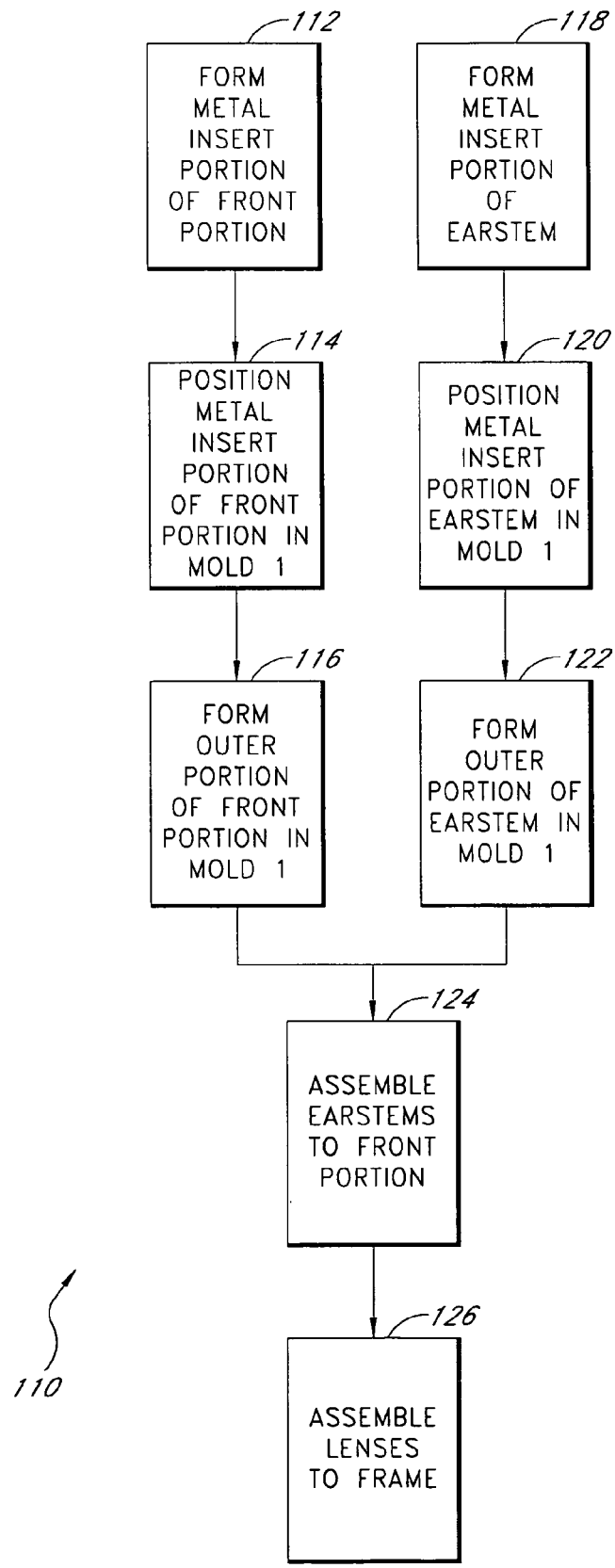
FIG. 9 is a flow diagram of a preferred method for constructing the eyeglass frame of FIG. 4, wherein a metal insert portion of the frame body and the earstem portion are formed first and the outer portion of the frame body and the earstem is formed over the metal insert portion.

FIG. 9 illustrates a preferred method 110 for constructing an eyeglass frame, such as the frame 20' of FIGS. 4 and 5. In the method of FIG. 9, the inner portions 38', 42' are initially formed from a metal material and the outer portions 36', 40' are formed over the inner portions 38', 42'.

In step 112, the insert portion 38' of the front portion 22' of the frame 20' is formed from a metal material. As described above, the metal material may be steel, aluminum, magnesium, titanium or other metal materials suitable for supporting an optical lens. The insert may be formed through any number of suitable processes, such as die casting or investment casting, as is appreciated by one of skilled in the art.

After the insert portion 38' is formed, it is positioned in a first mold in step 114. In step 116, the outer portion 36' is formed over the insert portion 38'. Preferably, the outer portion 36' is constructed from a plastic material that is injection molded (e.g., over-molded) over the insert portion 38'.

Preferably in a manner similar to that of the insert portion 38' of the front portion 22' in step 112, the insert portion 42' of the earstem 24' is formed in step 118. The formed insert portion 42' is positioned within a first mold in step 120 and, in step 122, the outer portion 40' of the earstem 24' is formed over the insert portion 42'. Preferably, the outer portion 40' is over-molded onto the insert portion 42' by an injection molding process.

Once the front portion 22' and earstems 24' are formed, they are assembled to one another in step 124' to create an assembled frame 20'. Once the frame 20' has been assembled, the lenses 28' are assembled into the frame 20' in step 126. The lenses 28' may be assembled to the frame 20' using any suitable method, such as using the retaining member 50 as described above in relation to FIGS. 4 and 5.

Figure 10:
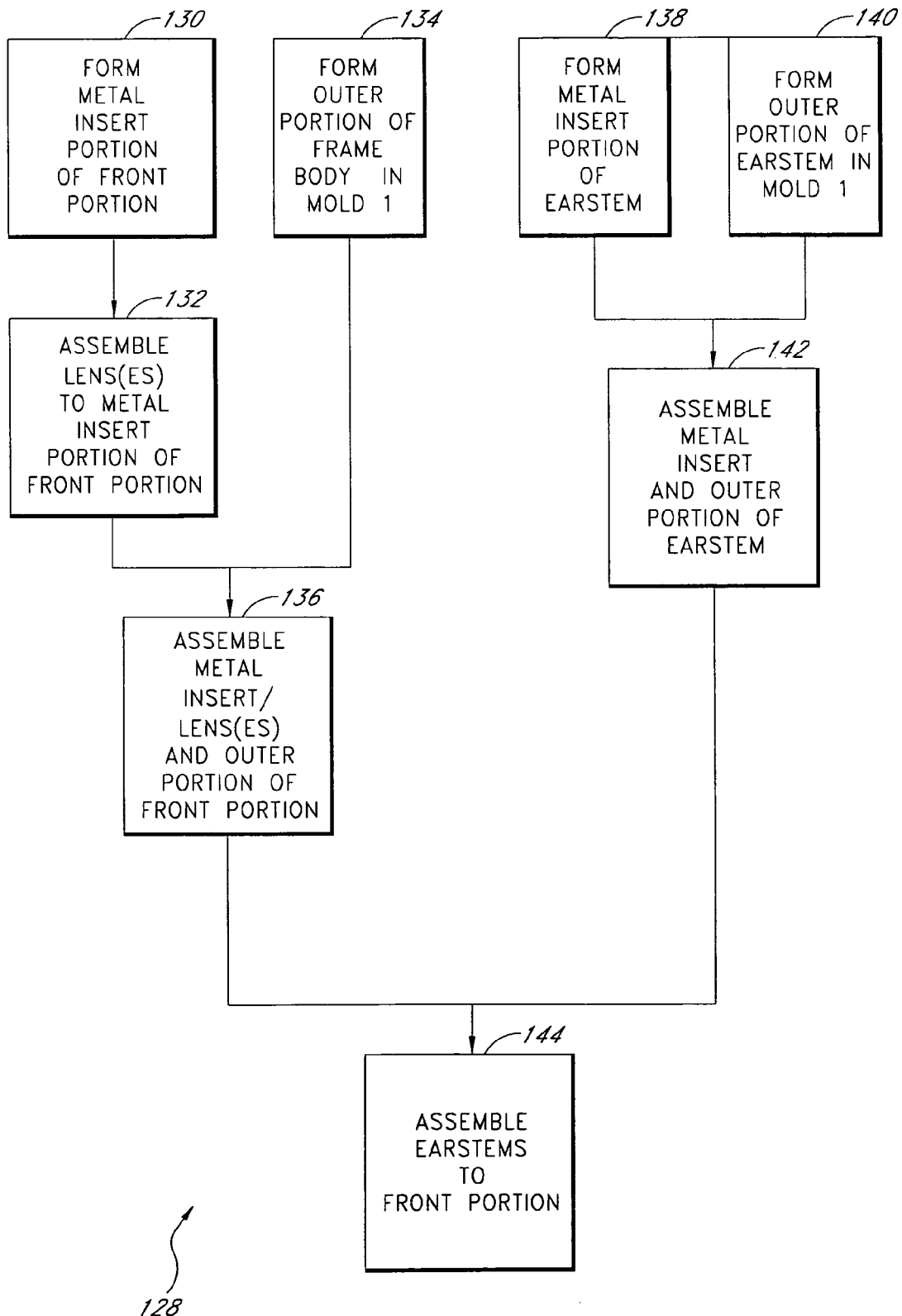
FIG. 10 is a flow diagram of a preferred method for constructing the eyeglass frame of FIG. 4, wherein the metal insert portion of the frame body and earstems are formed separately from the outer portion of the frame body and the earstems and the insert portion and outer portion are then assembled together.

FIG. 10 illustrates an alternative method 128 for constructing an eyeglass frame, such as the eyeglass frame 20' of FIGS. 4 and 5. In the method 128 of FIG. 10, the lenses 28' are assembled to form metal inserts 38' before assembly of the insert portion 38' to the outer portion 36'.

In step 130, a metal insert portion 38' of the front portion 22' of the eyeglass frame 20' is formed by a suitable method, such as those described above in relation to step 112 of FIG. 9. In step 132, the lenses 28' are assembled to the insert portion 38' by a suitable method such as using a retaining member 50, or using a standard split rim lock, as previously described.

The outer portion 36' of the front portion 22' of the eyeglass frame 20' is formed in step 134. Preferably, the outer portion 36' is formed from a plastic material by injection molding. However, other suitable methods and materials may also be used.

In step 136, the assembly of the insert portion 38' and lens 28' is assembled to the outer portion 36' through a suitable arrangement. For example, the insert 38' may be mechanically secured to the outer portion 36' through a snap-fit arrangement, mechanical fasteners or the like. In an eyeglass frame having a pair of optical lenses, two insert portion 38' and lens 28' assemblies are created in step 136.

In a manner similar to the metal insert portion 38' in step 130, the metal insert 42' of the earstem 24' is formed in step 138. In step 140, the outer portion 40' of the earstem 24' is formed in a first mold and, in step 142, the metal insert portion 42' and the outer portion 40' are assembled to form the earstem 24'. Once the front portion 22' and a pair of earstems 24' have been formed, they are assembled together in step 144 to create an assembled eyeglass frame, such as the frame 20' of FIGS. 4 and 5.

FIGS. 11 through 21 illustrate an alternative embodiment of an eyeglass frame, generally referred to by the reference numeral 150. Preferably, the eyeglass frame 150 includes inner and outer portions, more preferably, is comprised of two distinct members of material fixedly coupled to one another. In a preferred arrangement, the two members of material are at least partially co-extensive and each define at least a portion of a forward-facing surface of the eyeglass frame 150, as is described in greater detail below.

The eyeglass frame 150 includes a front portion 152, which defines at least one orbital, and preferably both right-side and left-side orbitals 154. As in the previous embodiments, the orbitals 154 are configured to support an optical lens (not shown). The illustrated front portion 152 includes a nose bridge 156 extending between the orbitals 154. In other arrangements, however, the front portion 152 may be configured to support a single, toroidal optical lens, as described above. Accordingly, in alternative arrangements, the orbital(s) do not necessarily entirely surround the lens, or lenses.

In the illustrated arrangement, a pair of earstems 158 extend in a rearward direction from opposing, lateral sides of the front portion 152. As in the previous embodiments, preferably the earstems 158 are connected to the front portion 152 through a hinge arrangement such that the earstems 158 are movable from a folded position to an opened position relative to the front portion 152, as is well known in the art.

Figure 11:
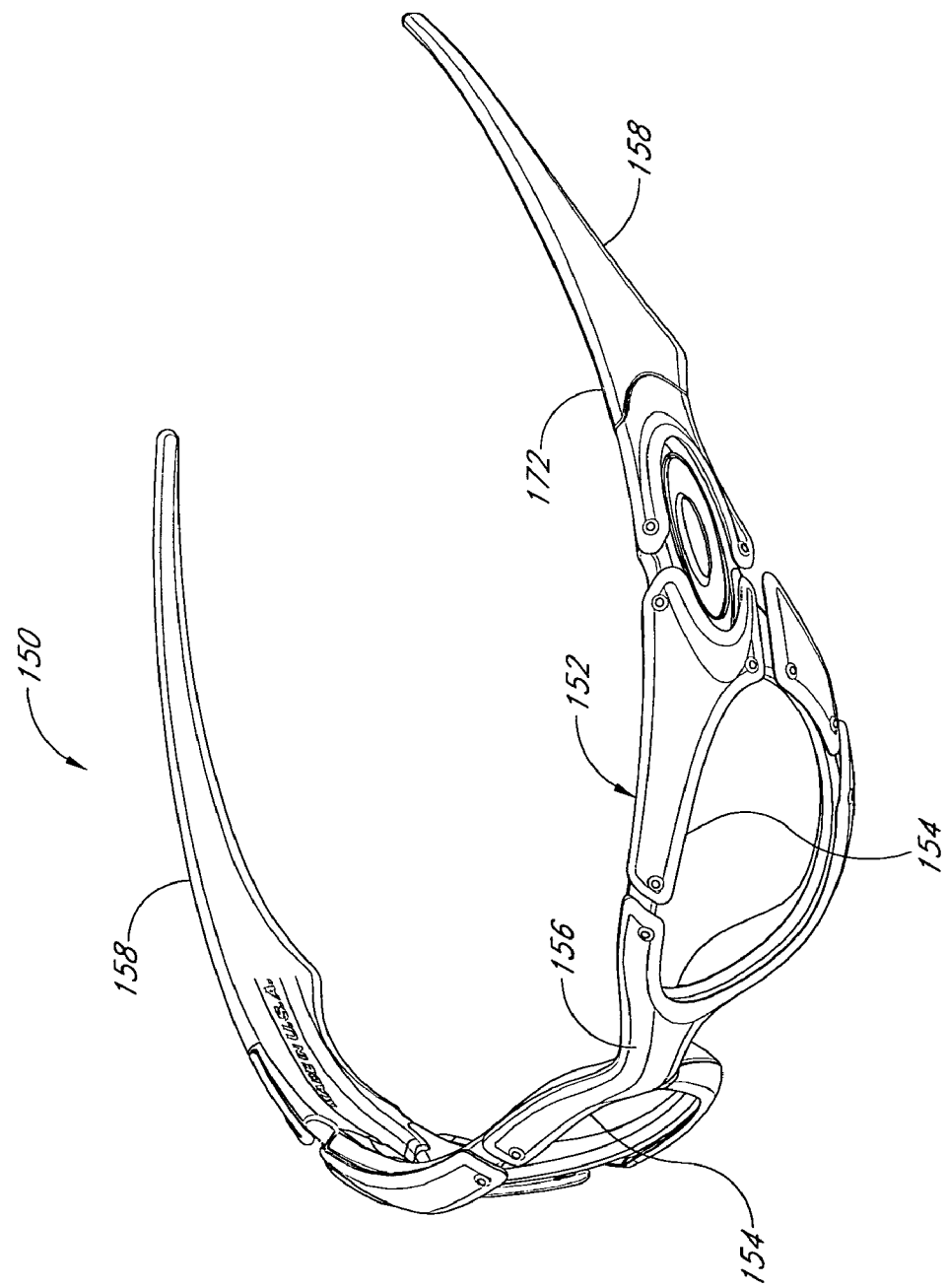
FIG. 11 is a front, top and left side perspective view of an alternative embodiment of an eyeglass frame having plate-like members attached to an external surface of an inner frame member.
Figure 12:
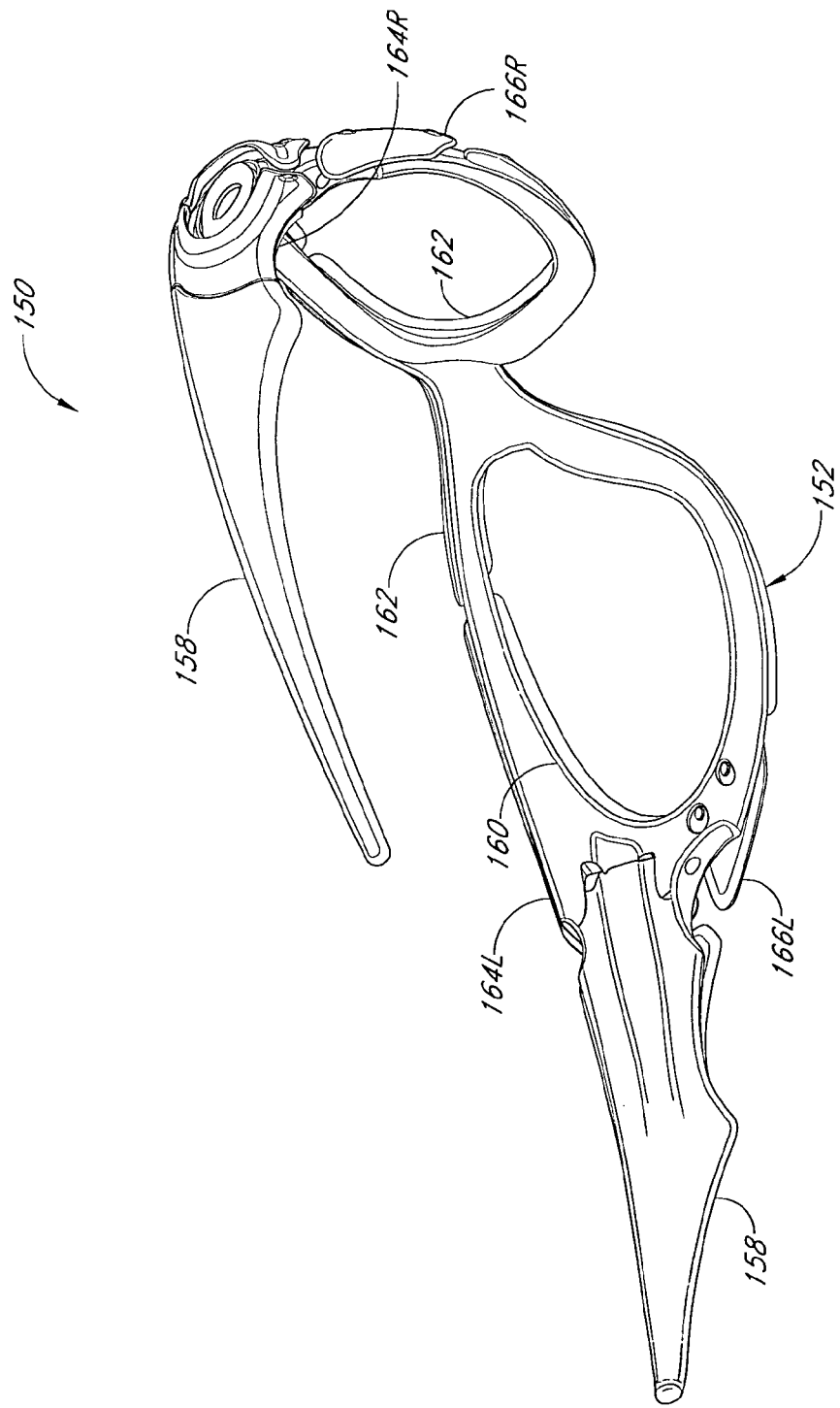
FIG. 12 is a rear, bottom and right side perspective view of the eyeglass frame of FIG. 11.
Figure 13:
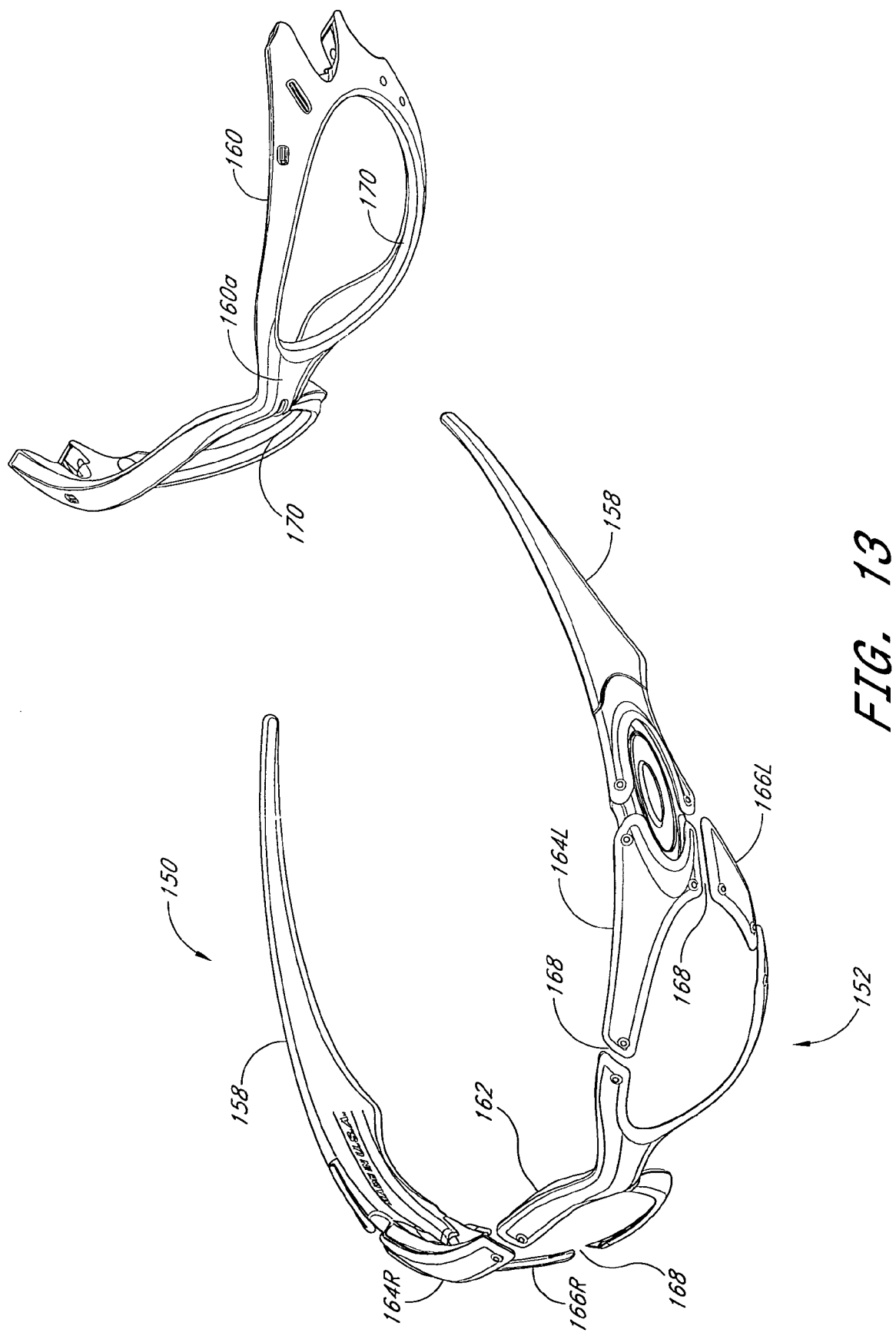
FIG. 13 is a front, top and left side perspective view of the eyeglass frame of FIG. 11 in an exploded condition illustrating the inner frame member separated from the plate-like members and ear stems.
Figure 14:
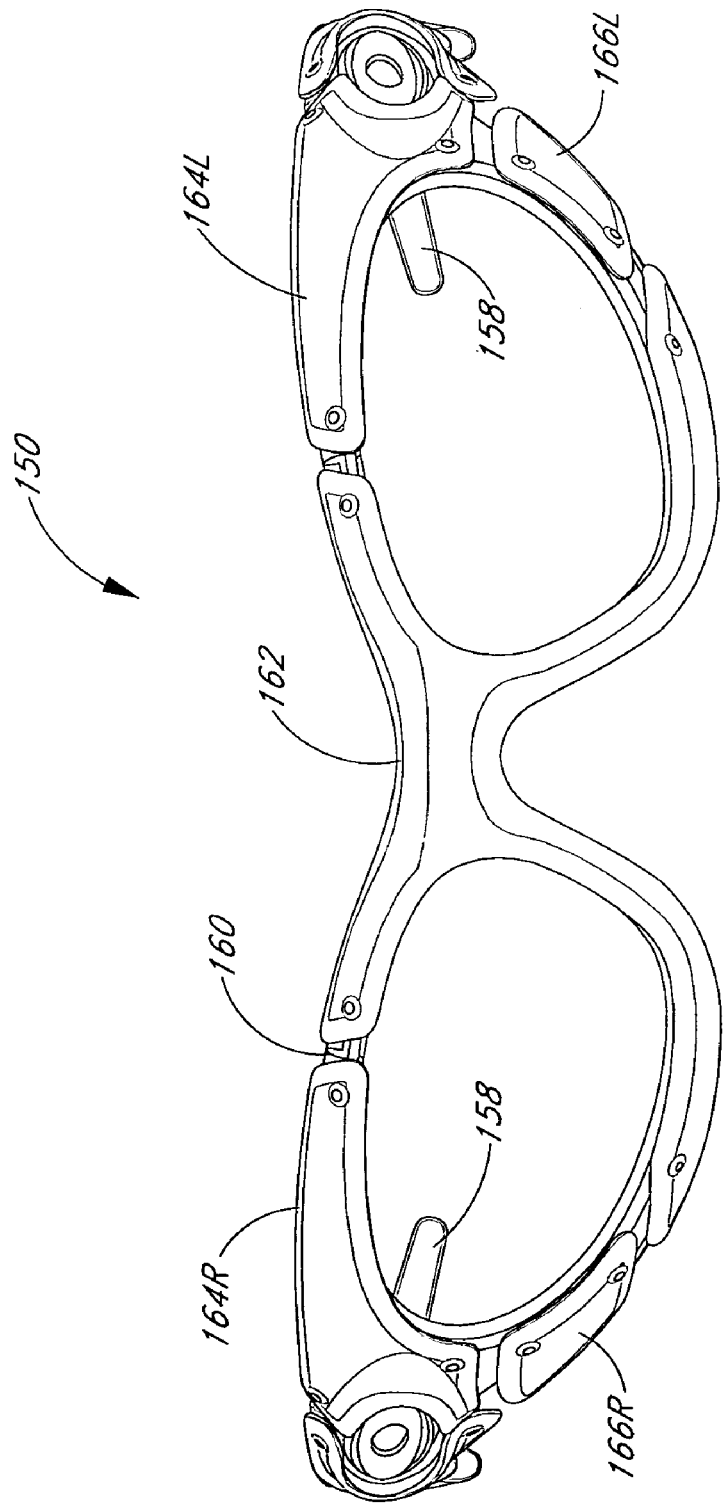
FIG. 14 is a front elevational view of the eyeglass frame of FIG. 11.
Figure 15:
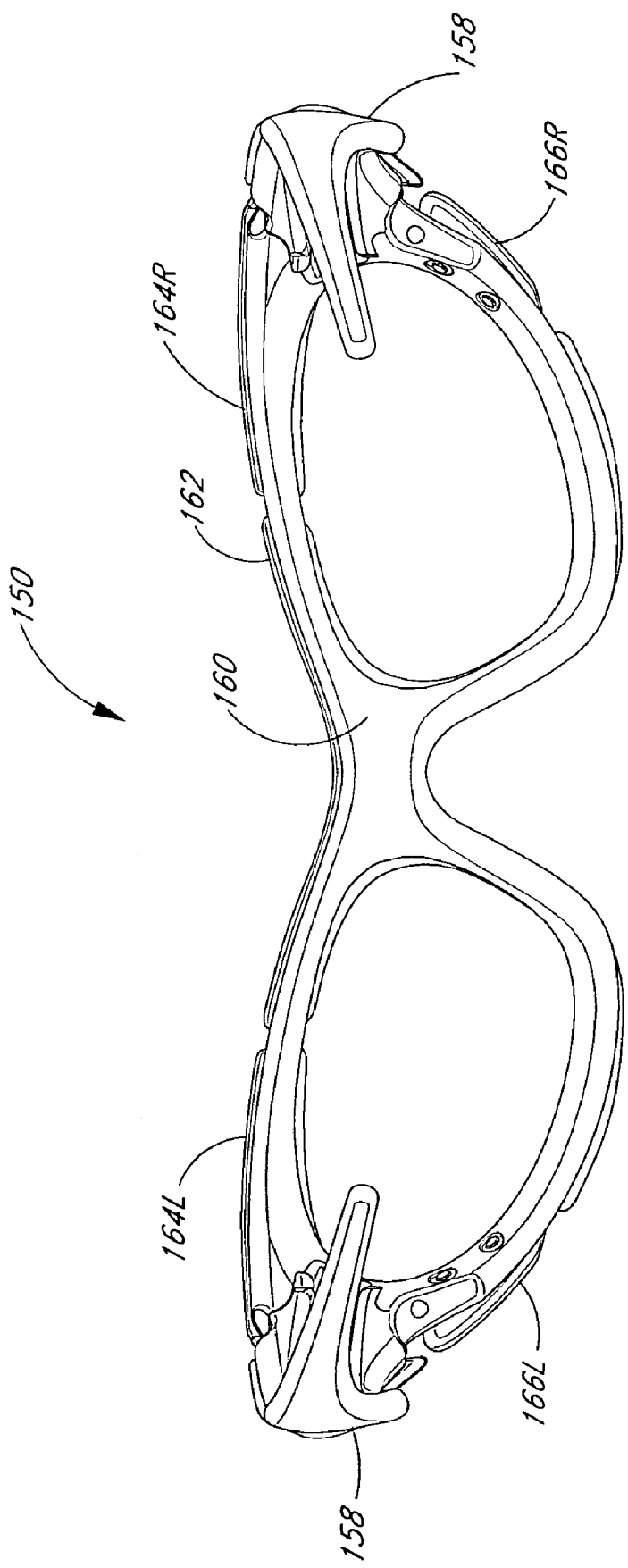
FIG. 15 is a rear elevational view of the eyeglass frame of FIG. 11.
Figure 16:
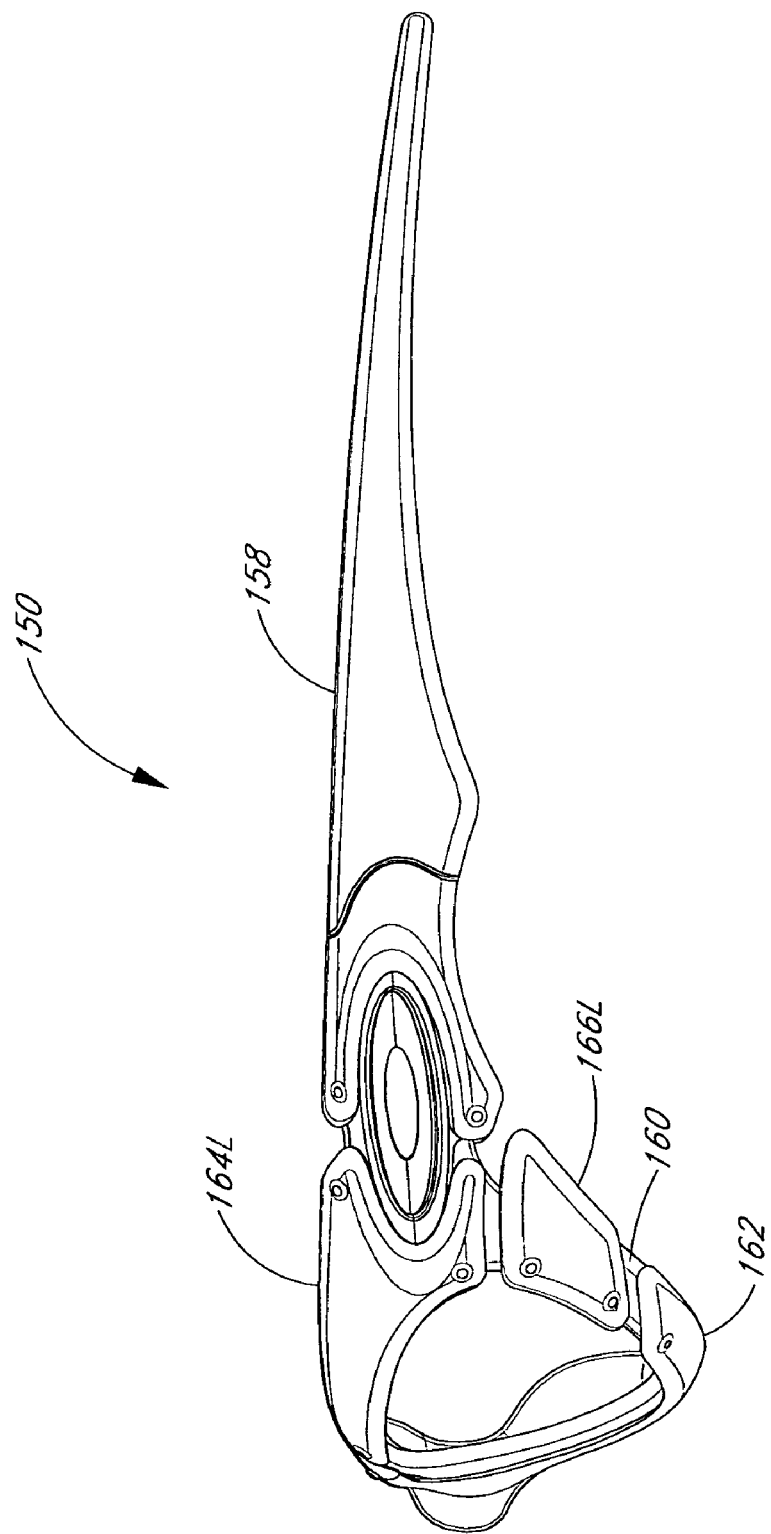
FIG. 16 is a left side elevational view of the eyeglass frame of FIG. 11.
Figure 17:
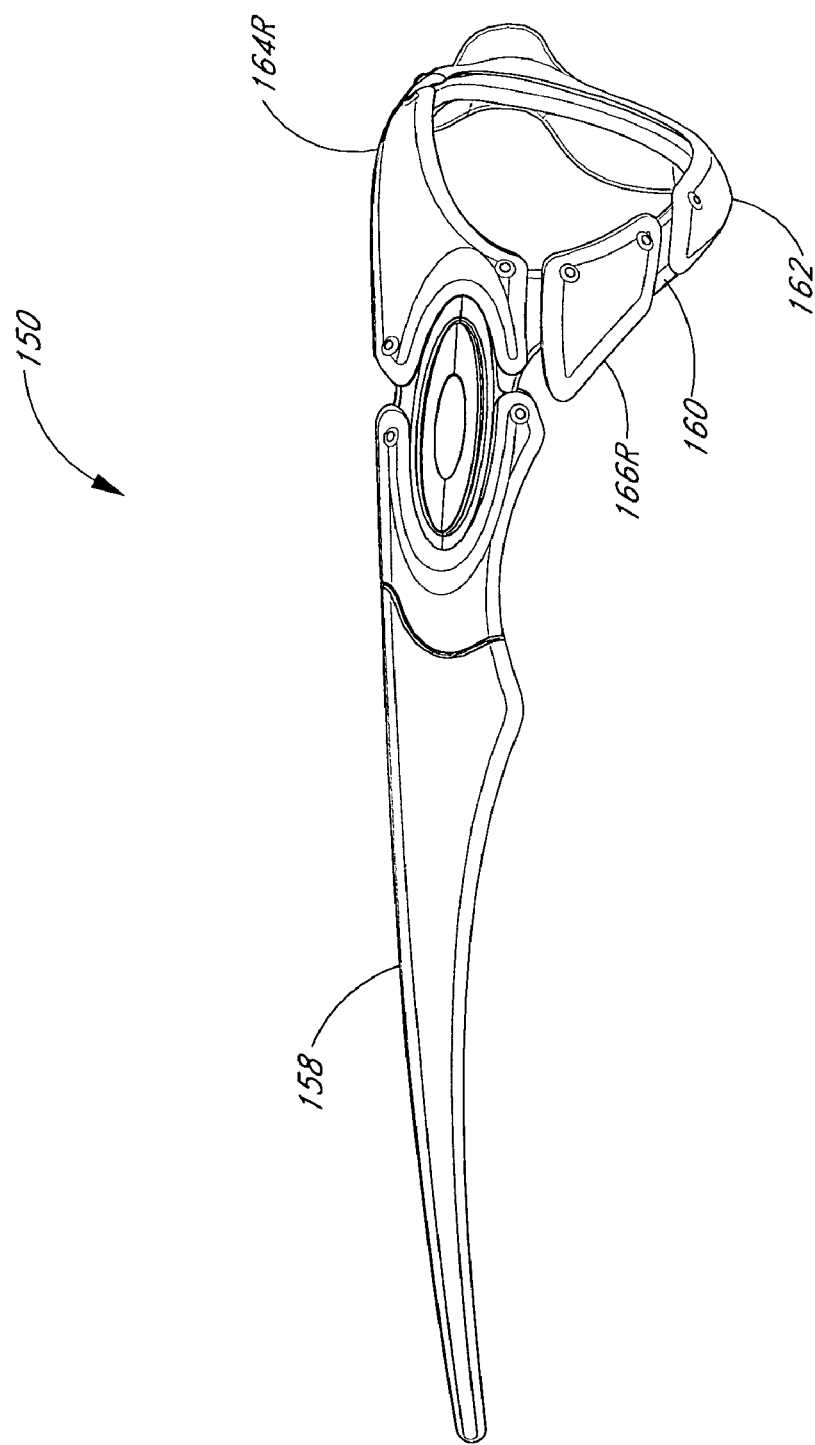
FIG. 17 is a right side elevational view of the eyeglass frame of FIG. 11.
Figure 18:
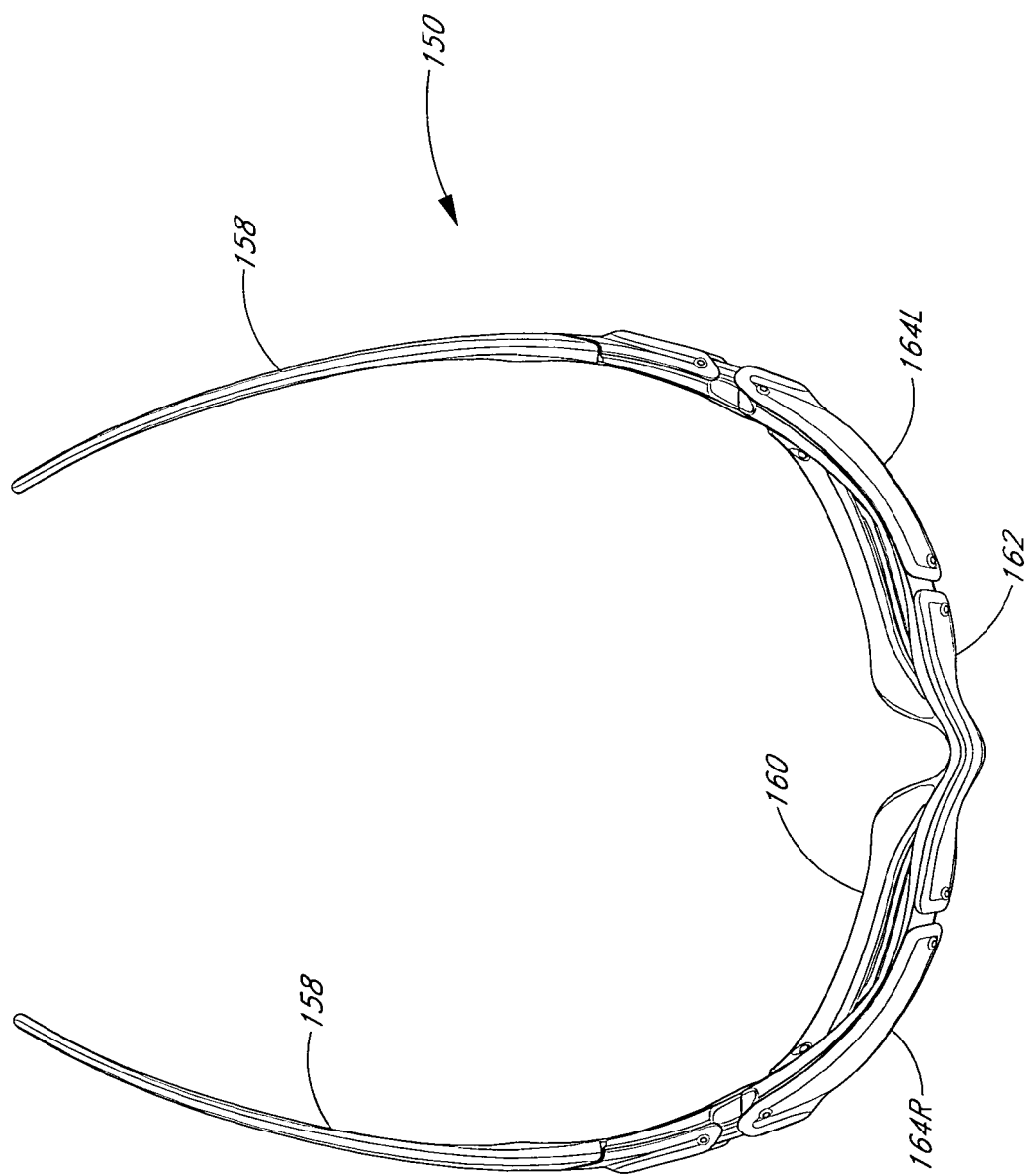
FIG. 18 is a top plan view of the eyeglass frame of FIG. 11.
Figure 19:
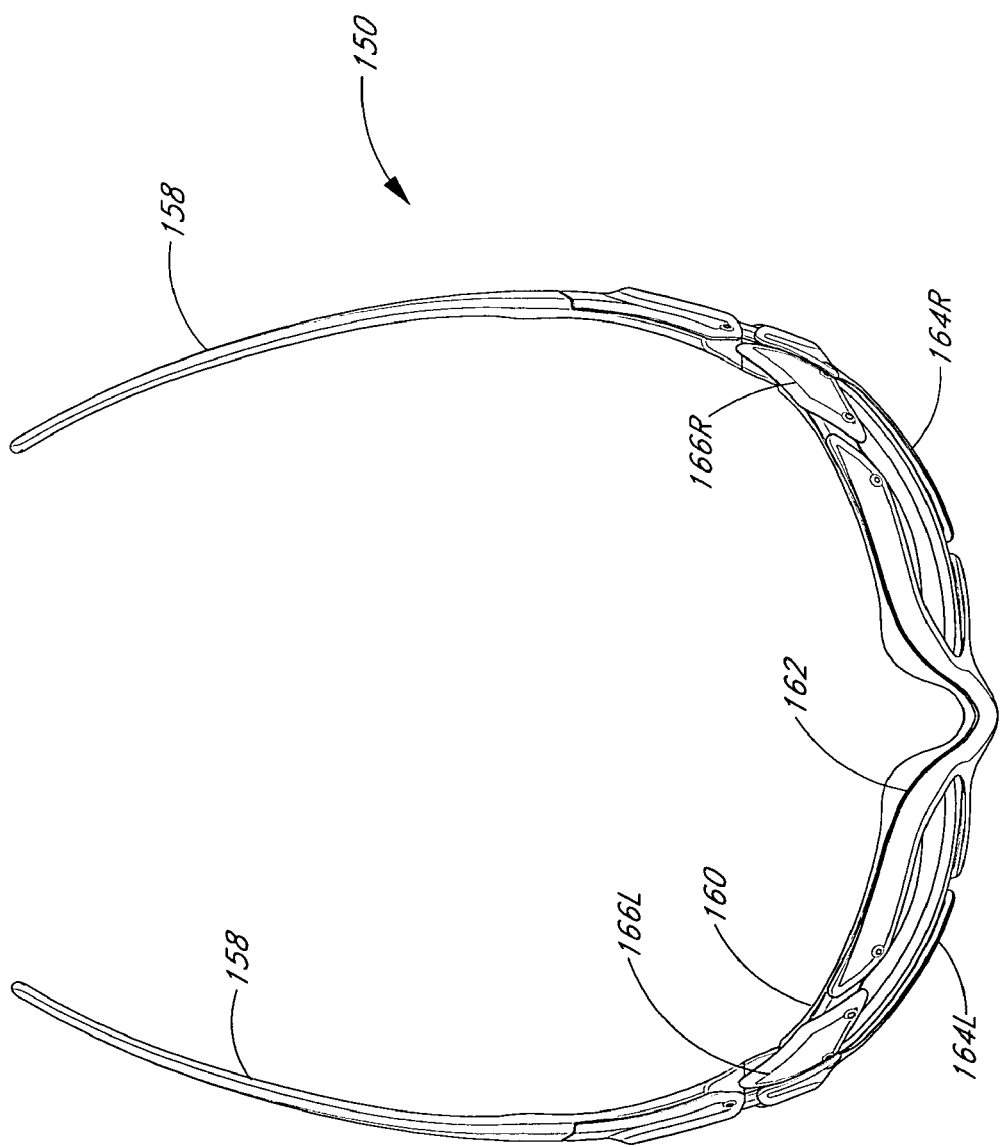
FIG. 19 is a bottom plan view of the eyeglass frame of FIG. 11.

With reference to FIGS. 11 through 13, the illustrated front portion 152 includes an inner frame member 160 and a plurality of outer, plate-like members, including a central member 162, a right upper member 164R, a left upper member 164L, a right lower member 166R, and a left lower member 166L. Preferably, the plate members 162, 164 and 166 are fixedly secured to the inner frame member 160 to form a front portion 152 that is of an integrated structure. Although multiple plate members 162, 164 and 166 are provided in the illustrated embodiment, other numbers of plate members may also be used, including a singular plate member, for example.

In the illustrated arrangement, the center plate member 162 and upper and lower plate members 164 and 166 are arranged to form a shape, which is generally similar in shape to a forward-facing surface 160A of the inner frame member 160. Desirably, the plate members 162, 164, 166 cover at least a portion of the forward-facing surface 160A of the inner frame member 160, while permitting a portion of the forward-facing surface 160A to be visible when the eyeglass frame 150 is viewed from the front. In the illustrated arrangement, the plates 162, 164, 166 cover substantially the entire forward-facing surface 160A of the inner frame member 160, with the exception of relatively small gaps 168 between the individual plates 162, 164, 166. Thus, the inner frame member 160 comprises a first member of material of the front portion 152 and the plate members 162, 164, 166 comprise a second member of material of the front portion 152. These two members can be the same color. Alternatively, the two members can be different colors.

In a preferred arrangement, the center plate member 162 extends from approximately a central portion, of both an upper and a lower side, of the pair of orbitals 162 and across the nose bridge 156 of the eyeglass frame 150. The upper and lower plate members 164, 166 cooperate with the center plate member 162 to substantially surround the remaining portion of the respective right-side and left-side orbitals 154. Thus, the plate members 162, 164, 166 cooperate to substantially surround each of the right and left orbitals 154. In addition, as described above, the inner frame member 160 preferably also surrounds each orbital 154 and, in a preferred arrangement, defines a pair of grooves 170 configured to support an optical lens (not shown).

With reference to FIG. 12, preferably, at least a portion of one or more of the plate members 162, 164, 166 defines a frontal surface area that is greater than the frontal surface area of a corresponding portion of the inner frame member 160. That is, at least a portion of a peripheral edge of one or more of the plate members 162, 164, 166 extends beyond a corresponding peripheral edge of the inner frame member 160. Thus, in the illustrated arrangement, an "armored" outward appearance is achieved, wherein the plate members 162, 164, 166 appear as protective armor supported by the smaller, inner frame member 160. In other arrangements, however, a peripheral edge of inner frame member 160 may extend beyond a corresponding peripheral edge of one or more of the plate members 162, 164, 166. Accordingly, in such an arrangement, the inner frame member 160 may have a larger frontal surface area than the combination of plate members 162, 164, 166.

In the illustrated arrangement, the plate members 162, 164, 166 are fixedly secured to the forward-facing surface 160A of the inner frame member 160 by an ultrasonic welding process. In such a process, one or both of the plate members 162, 164, 166 and the inner frame member 160, are subjected to ultrasonic vibrations. When the plate member and the inner frame member 160 are brought into contact with one another, the resulting vibratory energy is converted to heat, which melts and welds the plate member to the inner frame member 160. Such a process is known in the art and, therefore, a further description is not deemed necessary in order to practice the invention.

Although an ultrasonic welding process is preferred, the plate members 162, 164, 166 may be secured to the inner frame member 160 by other suitable processes or methods. For example, mechanical fasteners, such as screws or rivets for example, may also be used. Alternatively, adhesives may be used to secure the plate members 162, 164, 166, to the inner frame member 160. In another arrangement, the plate members 162, 164, 166 may be over-molded onto the inner frame member 160, similar to the process described with reference to the eyeglass frames 20, 20', of FIGS. 1-10.

In a preferred arrangement, both the inner frame member 160 and the plate members 162, 164, 166 are constructed of a plastic material by a suitable process, such as injection molding, for example. That is, in one preferred arrangement, the inner frame member 160 and the plate members 162, 164, 166 are constructed from the same, or a similar material. In other arrangements, however, the inner frame member 160 and the plate members 162, 164, 166 may be constructed of dissimilar materials. For example, the plate members 162, 164, 166 may be constructed from a metal material (such as steel, aluminum, titanium, or magnesium, for example), while the inner frame member 160 is constructed from a plastic material. Other combinations are also possible, as may be appreciated by one of skill in the art.

The earstems 158 may also include an inner frame member and one or more outer plate members, similar to those described in relation to the front portion 152 of the eyeglass frame 150. For example, a forward portion 172 of the earstems 158 may comprise another plate member fixedly secured to the remainder of the earstem 158, which serves as an inner frame member.

Figure 20:
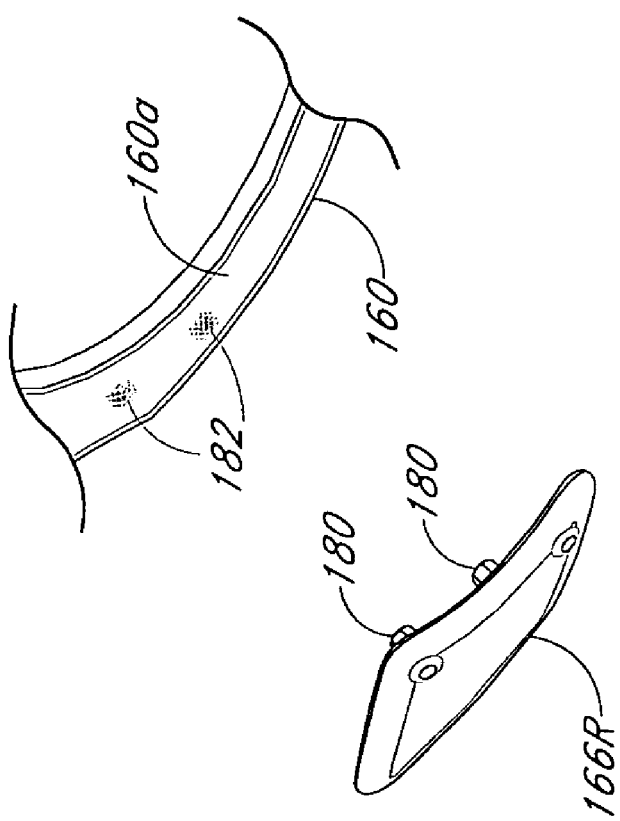
FIG. 20 is an enlarged view of a portion of the inner frame and a plate member that has yet to be assembled to the inner frame member. The plate member includes a pair of projection facing the inner frame member and the inner frame member includes a corresponding pair of roughened surface area portions facing the projections of the plate member.

As described above, preferably the plate members 162, 164, 166 are fixedly secured to the inner frame member 160 by an ultrasonic welding process. With reference to FIG. 20, a preferred arrangement for enhancing the ultrasonic welding process is illustrated. Desirably, an rearward-facing surface of the right lower plate member 166R, which faces the forward-facing surface 160A of the inner frame member 160, includes a pair of projections 180, extending in a rearward direction from the plate member 166R. A pair of corresponding roughened surface areas 182 are provided on the forward-facing surface 160A of the inner frame member 160 and are sized, shaped and spaced to align with the projections 180.

In operation, the projections 180 function as energy directors during the ultrasonic welding process. The energy directors, or projections 180, provide a reduced contact surface area between the plate member 166R and the forward-facing surface 160A of the inner frame member 160. Such an arrangement focuses the energy into a small area to increase the heat generated and, thus, permit rapid melting of the projections 180 to form a welded joint between the plate member 166 and the inner frame member 160. The roughened surface areas 182 operate to retain the projections 180 in a desired location, relative to the inner frame member 160, during the welding process.

Figure 21:
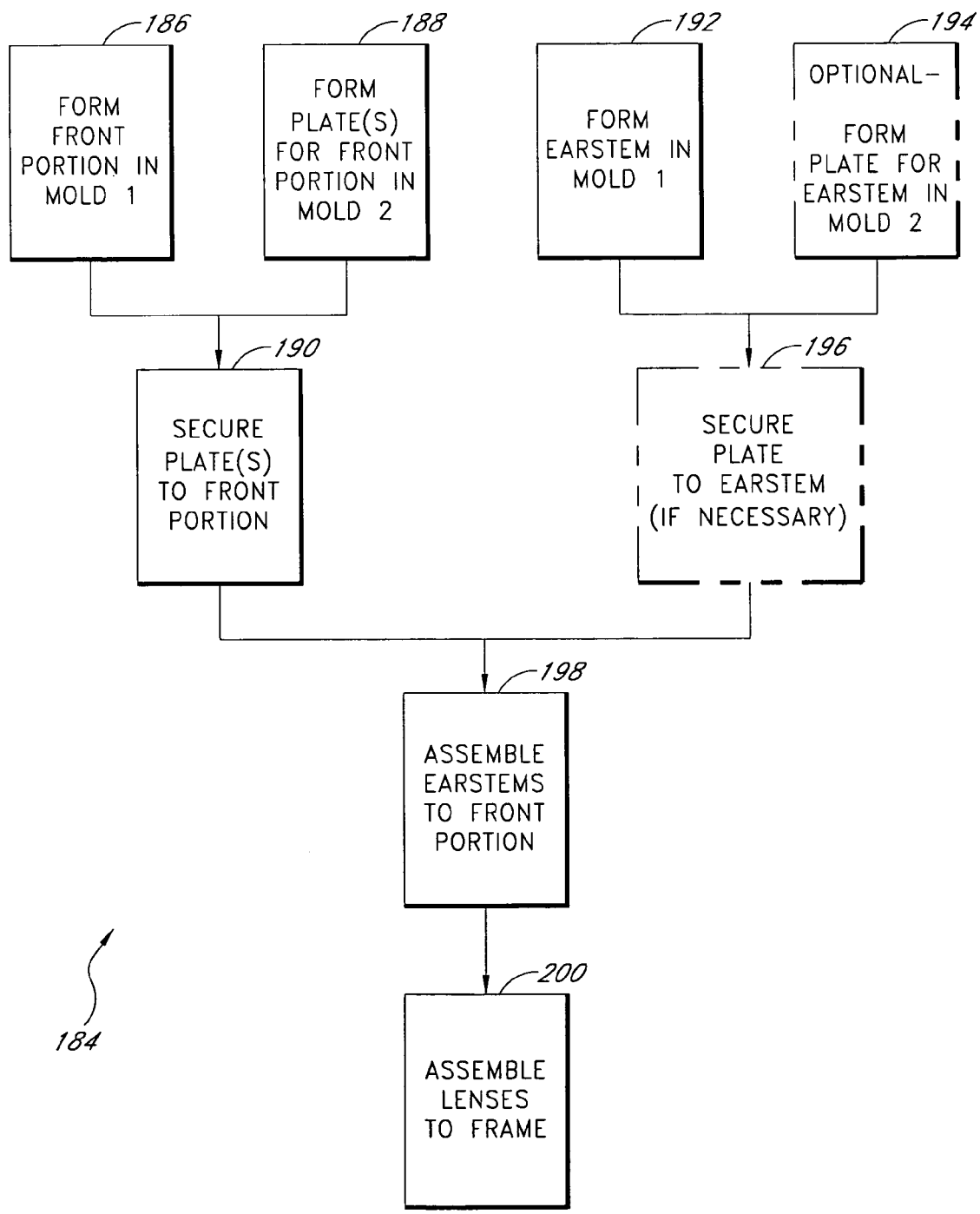
FIG. 21 is a flow diagram of a preferred method for constructing the eyeglass frame of FIG. 11.

With reference to FIG. 21, a preferred method 184 is illustrated in a process flow diagram for a construction of an eyeglass frame, such as the eyeglass frame 150 of FIG. 11 through 20. In step 186, the inner frame member 160 of the front portion 152 of the eyeglass frame 150 is formed in a first mold. As described above, preferably the inner frame member 160 is formed from a plastic material by injection molding. In step 188, the plate members 162, 164, 166 are formed in a second mold, or plurality of molds. Preferably, the plate members 162, 164, 166 are also constructed of a plastic material by an injection molding process.

In step 190, the plates 162, 164, 166 are secured to the inner frame member 160, preferably by an ultrasonic welding process, as described above. However, other suitable methods of securing the plate members 162, 164, 166 to the inner frame member 160 may also be used.

In step 192, the earstem 158 is formed in a first mold. Preferably, the earstem 158 is formed from a plastic material by an injection molding process. Optionally, in step 194, an earstem plate member may be formed in a second mold. Preferably, the earstem plate member would also be constructed of a plastic material by an injection molding process. In step 196, if necessary, the earstem plate member would be secured to the earstem 158, preferably by an ultrasonic welding process.

In step 198, a pair of earstems, preferably each being formed by a process as described in relations to steps 192, 194, 196, are assembled to the front portion 152 to form a frame assembly 150. In step 200, a pair of optical lenses (not shown) are assembled to the completed frame assembly 150, as is well known in the art. Although the above-described process is preferred, other suitable processes for creating the eyeglass frame 150 may also be used.

In the above-described embodiments, two members of material are secured to one another to create an eyeglass frame to achieve a desired aesthetic appearance. As such, preferably, a forward-facing surface of each of the members is visible when viewed from a forward side of the eyeglass frame. Thus, the first and second members preferably are at least partially, but not entirely, coextensive. In addition, each of the members are desirably "sculpted". That is, preferably, each of the members varies in either, or both, cross-sectional area and cross-sectional shape at various points along the members. In other words, desirably, each of the members contributes to the outward appearance of the eyeglass frame and is not provided, at least entirely, for the purpose of strengthening the frame. Accordingly, in a preferred arrangement, neither member is of a consistent cross-sectional area, or shape, as opposed to a typical stiffening members, such as a stiffening wire, for example.

Although the present invention has been described in relation to preferred embodiments, it is not intended to limit the present invention to the embodiments disclosed. Modifications apparent to one of ordinary skilled in the art may be made without departing from the true spirit and scope of the invention. Accordingly, the present invention is intended to be defined only by the appended claims.

What is claimed is:

1. An eyeglass frame, comprising:
   a frame body including a frame portion and first and second earstem portions, said frame portion defining first and second orbitals, each of said orbitals configured to support an optical lens, said earstem portions being spaced from one another and extending in a rearward direction from said frame portion;
   wherein said frame body comprises a first member and a second member, said first member and said second member being at least partially coextensive, and each of said first and second members defining a portion of an outer surface of said frame body, said second member formed of one of a transparent and a translucent material such that said first member is visible through said second member.

2. The eyeglass frame of claim 1, wherein said first member defines a recess and said second member occupies said recess.

3. The eyeglass frame of claim 1, wherein said second member is mechanically secured to said first member.

4. The eyeglass frame of claim 1, wherein said second member is chemically secured to said first member.

5. The eyeglass frame of claim 1, wherein said first member extends over no more than about one-third of a total length of said earstem portions.

6. The eyeglass frame of claim 5, wherein said first member extends over about one-third of said total length of said earstem portions.

7. The eyeglass frame according to claim 5, wherein the first portion is formed of a metal material.

8. The eyeglass frame according to claim 5, wherein the second portion is formed of a translucent material.

9. The eyeglass frame according to claim 5, wherein second portion is formed from a transparent material.

10. An eyeglass frame comprising a frame body including a frame portion and first and second earstem portions, said frame portion defining at least one orbital configured to support an optical lens, wherein said frame body comprises a first layer and a second layer, said first layer and said second layer being at least partially coextensive, and means for affixing said first layer to said second layer such that each of said first and second layer define a portion of an outer surface of said frame body, said second layer formed of one of a transparent and a translucent material such that said first layer is visible through said second layer.

11. An eyeglass frame, comprising:
   a plurality of plate-like members cooperating to form a discontinuous frame portion defining at least one orbital;
   a frame member sized and shaped to interconnect at least a portion of said plurality of plate-like members;
   wherein said portion of said plate-like members are supported by said frame member and wherein at least a portion of each of said plate-like members extends beyond an edge of a surface of said frame member on which said plate-like member is supported.

12. The eyeglass frame of claim 11, wherein said plurality of plate-like members are affixed to a forward-facing surface of said frame member.

13. The eyeglass frame of claim 11, wherein said plurality of plate-like members and said frame member comprise a plastic material.

14. The eyeglass frame of claim 11, wherein said plurality of plate-like members are a different color than said frame member.

15. The eyeglass frame of claim 14, wherein said frame member is substantially transparent.

16. An eyeglass frame, comprising:
   a frame member defining an orbital;
   a plurality of plate-like members cooperating to form a discontinuous frame portion surrounding said orbital;
   wherein said plate-like members are permanently affixed to said frame member and wherein at least a portion of each of said plate-like members extends beyond an edge of a surface of said frame member on which said plate-like member is supported.

17. The eyeglass frame of claim 16, wherein said surface of said frame member is a forward facing surface.

18. The eyeglass frame of claim 16, wherein said plurality of plate-like members surrounding said orbital comprises at least three plate-like members.

* * * * *